(12) United States Patent
Kaizu et al.

(10) Patent No.: US 8,479,235 B2
(45) Date of Patent: *Jul. 2, 2013

(54) INFORMATION PROCESSING APPARATUS AND METHOD, AND PROGRAM STORAGE MEDIUM

(75) Inventors: Tatsuo Kaizu, Tokyo (JP); Takuma Miyazaki, Tokyo (JP); Hiroyuki Hanaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

This patent is subject to a terminal disclaimer.

(21) Appl. No.: 12/858,893

(22) Filed: Aug. 18, 2010

(65) Prior Publication Data

US 2010/0316356 A1    Dec. 16, 2010

Related U.S. Application Data

(62) Division of application No. 10/016,765, filed on Oct. 22, 2001, now Pat. No. 7,890,982.

(30) Foreign Application Priority Data

Oct. 24, 2000    (JP) ................................ 2000-324015

(51) Int. Cl.
*H04N 7/18* (2006.01)

(52) U.S. Cl.
USPC .............. 725/78; 725/110; 709/219; 348/734

(58) Field of Classification Search
USPC ..... 725/78–85, 106–120, 131–134, 139–142, 725/153; 709/217–232; 386/297–300; 348/734
See application file for complete search history.

(56) References Cited

U.S. PATENT DOCUMENTS

| | | | |
|---|---|---|---|
| 5,479,267 A | 12/1995 | Hashimoto | |
| 6,097,441 A | 8/2000 | Allport | |
| 6,104,334 A | 8/2000 | Allport | |
| 6,401,059 B1 | 6/2002 | Shen et al. | |
| 6,407,779 B1 | 6/2002 | Herz | |
| 6,437,836 B1 | 8/2002 | Huang et al. | |
| 6,496,122 B2 | 12/2002 | Sampsell | |
| 6,760,537 B2 | 7/2004 | Mankovitz | |
| 6,862,741 B1 | 3/2005 | Grooters | |
| 6,956,833 B1 * | 10/2005 | Yukie et al. | 370/328 |
| 7,735,110 B2 | 6/2010 | Kaizu et al. | |
| 7,890,982 B2 * | 2/2011 | Kaizu et al. | 725/78 |
| 2001/0046366 A1 | 11/2001 | Susskind | |
| 2002/0046407 A1 | 4/2002 | Franco | |
| 2002/0083455 A1 | 6/2002 | Sato | |
| 2002/0151271 A1 | 10/2002 | Tatsuji et al. | |
| 2004/0019903 A1 | 1/2004 | Knudson et al. | |
| 2005/0028208 A1 * | 2/2005 | Ellis et al. | 725/58 |
| 2006/0288374 A1 | 12/2006 | Ferris et al. | |

\* cited by examiner

*Primary Examiner* — Annan Shang
(74) *Attorney, Agent, or Firm* — Oblon, Spivak, McClelland, Maier & Neustadt, L.L.P.

(57) ABSTRACT

This invention is intended to allow user to easily and quickly set the preset recording of television programs on recording devices. When setting the preset recording of a television program on a VCR, the user of a personal computer first accesses an EPG server on the Internet to download the preset recording data of that program. The personal computer converts the downloaded preset recording data into a G-code and transmits the G-code from a video mouse to the VCR as an infrared signal. The VCR decodes the received G-code, recognizes the program to be preset for recording, and sets the preset recording of the recognized program.

18 Claims, 22 Drawing Sheets

F I G. 1
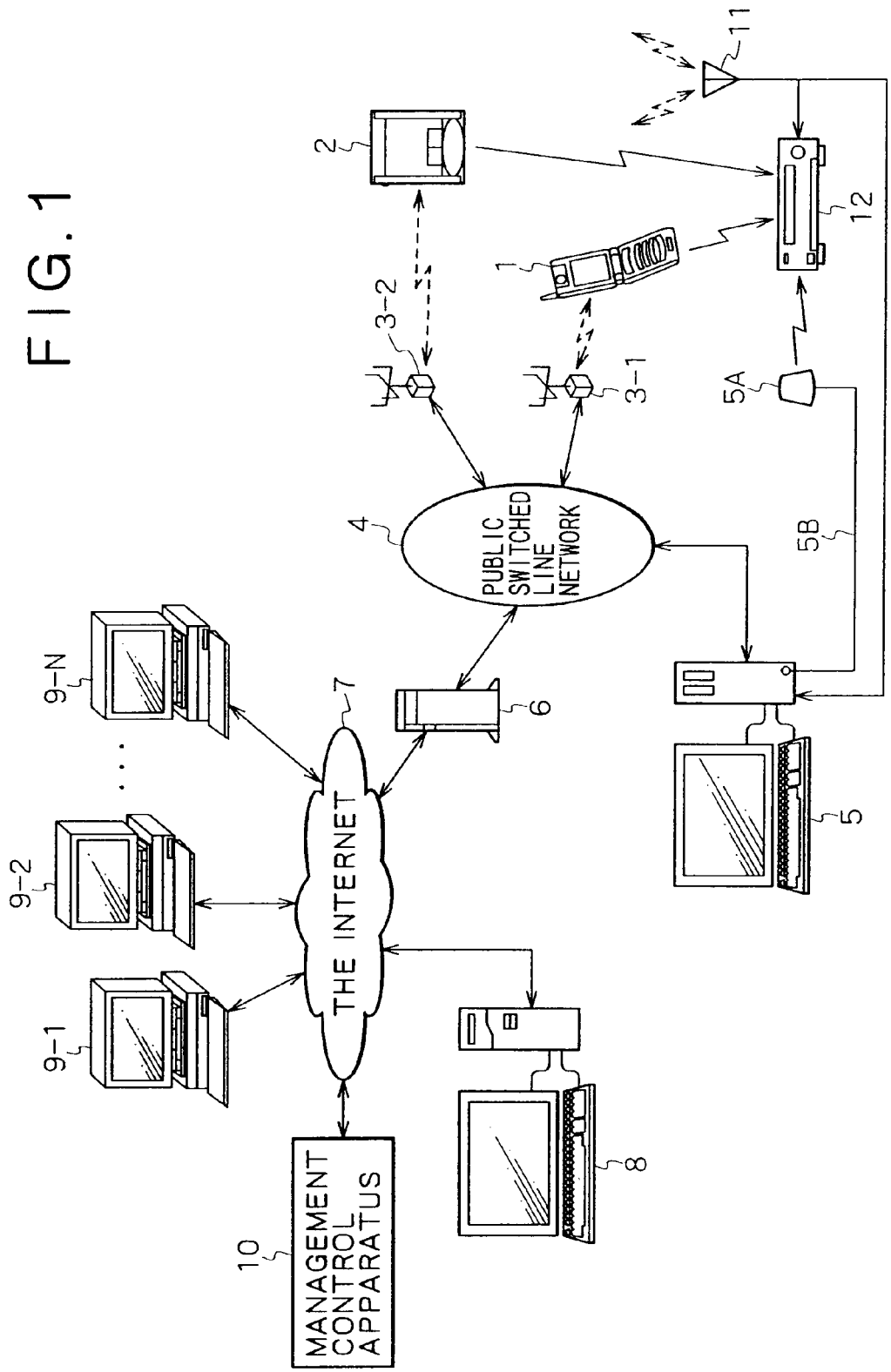

FIG.13

| BROADCAST GUIDE | | 1CH | | 3CH | | 4CH | | 6CH |
|---|---|---|---|---|---|---|---|---|
| | | NHK GENERAL | | NHK EDUCATIONAL | | NIHON TV | | TBS |
| 19:00 | 0 | 7 O'CLOCK NEWS<br>·TODAY'S NEWS<br>·SPORTS CORNER<br>·FOREIGN EXCHANGE/<br>STOCK INFORMATION<br>·WEATHER INFORMATION<br>CASTER 201-1 [R]<br>201-2 [R] | 0 | AFTER-SCHOOL CLUB<br>WELCOME JUNIOR FELLOWS<br>201-5 [R]<br>201-6 | 0 | PROFESSIONAL BASEBALL<br>"GIANTS VS. DRAGONS"<br>TOKYO DOME<br>COMMENTATOR:<br>MOTODAI TOSHU<br>ANNOUNCER:<br>NIIDATE SABURO<br>201-10 [R] | 0 | FRIDAY TV'S TAIYO 1<br>"EMERGENCY WARD<br>AROUND THE CLOCK"<br>201-11 [R] |
| | 57 | TV MAP | 30<br>45 | SIGN LANGUAGE CORNER<br>TOMORROW'S HEALTH 201-7 [R] | | | | |
| 20:00 | 0 | DRAMA<br>"NANDARA KANDARA" [R]<br>201-3 | 0 | WITH YOU TONIGHT<br>201-8 [R] | | | | |
| | 45 | LOCAL WEATHER<br>FORECAST<br>201-4 [R] | 30 | LET'S LEARN BRAILLE<br>201-9 [R] | | | | |

RETURN

FIG. 14

SUBJECT:TVPI200006021900

CONTENT-TYPE:APPLICATION/X-TV-PROGRAM-INFO;CHARSET=SHIFT_JIS
VERSION:1
STATION:NIHON TV
YEAR:2000
MONTH:06
DATE:02
START:19:00
END:20:54
PROGRAM-TITLE:PROFESSIONAL BASEBALL

~ NAGOYA DOME  GIANTS VS. DRAGONS  COMMENTATOR·MOTODAI TOSHU
ANNOUNCER·NIIDATE SABURO
(MAX. EXTENSION UP TO 0924;SUBSEQUENT PROGRAMS BROUGHT DOWN)

AFTER THE BENCH-CLEARING BRAWL WITH YOKOHAMA, TEAM LEADER
TACHIKAWA OF THE DRAGONS PUTTING MORE HEART INTO THE JOB,
IMPROVING THE TEAM'S CONDITION AS WELL AS HIS OWN BATTING
PERFORMANCE. HE CAN BE EXPECTED AS A POINT MAN IN THE NEXT
THREE-GAME SERIES WITH THE GIANTS.

FIG.15

1, 0, 1, NHK GENERAL, NHK GENERAL, NHK
3, 0, 3, NHK EDUCATIONAL, NHK EDUCATIONAL, NHK2
4, 0, 4, NIHON TV, NIHON TV, NITTELE, NIHON TV BROADCAST NETWORK, NTV
5, 0, 5, SCOPE, SCOPE
6, 0, 6, TOKYO BROADCAST, TOKYO BROADCAST, TBS TV, TBS
8, 0, 8, FUJI TV, FUJI TV, FUJI TELEVISION, CX, FUJI
7, 0, 7, VAIO TV, VAIO TV, VAIO
9, 0, 9, NHK SATELLITE 2, NHK SATELLITE 2, BS2, NHKBS2
10, 0, 10, TV ASAHI, TV ASAHI, NATION-WIDE ASAHI BROADCAST, TV-ASAHI. TELE ASA, ANB, TVASA
11, 0, 11, NHK SATELLITE 1, NHK SATELLITE 1, BS1, NHKBS1
12, 0, 12, TV TOKYO, TV TOKYO, TELETO, TVTOKYO, TX, TVTOK

FIG. 18

```
     SELECT CATEGORY                    ~35

[1] TODAY'S PROGRAMS
[2] TOMORROW'S PROGRAMS
▽RECOMMENDED PROGRAMS
▽CLIP PROGRAMS
▽MEMO
[3] SERVICE AGREEMENTS
[4] DESCRIPTION OF FUNCTIONS

[RETURN]
```

FIG. 19

```
     TOMORROW'S PROGRAMS               ~35
9/29 (FRIDAY)
[1] MOVIE
[2] DRAMA
[3] SPORTS
[4] MUSIC
[5] VARIETY
[6] DAILY LIFE AND HOBBY
[7] SOCIETY AND NEWS REPORT
[8] CULTURE

[RETURN]
```

FIG. 20

```
            SPORTS                    ~35
9/29
[ 1 ] OLYNPICS 07:55 A.M.
[ 2 ] OLYMPICS 08:35 A.M.
[ 3 ] NEWS 10:00 A.M.
              •
              •
              •
[10] PROFESSIONAL BASEBALL 19:00 P.M.

[RETURN]
```

FIG. 21

```
       PROFESSIONAL BASEBALL          ~35

9/29 (FRIDAY)
19:00 P.M. ≫ 20:54 P.M.
NIHON TV
SPORTS/PROFESSIONAL BASEBALL
▽GIANTS VS. DRAGONS
  COMMENTATOR:MOTODAI TOSHU
  ANNOUNCER:NIIDATE SABURO
  ~NAGOYA DOME

[RETURN]
                        [DOWNLOAD]    ~221
```

FIG. 23

YOU CANNOT PRESET THIS PROGRAM
FOR RECORDING BECAUSE THE DATA OF
PRESET RECORDING NUMBER 1 PARTIALLY
OVERLAP WITH RECORDING TIME

FIG. 24

SETTING OF PRESET RECORDING
HAS BEEN COMPLETED.

PRESET NUMBER: 2

INFORMATION PROCESSING APPARATUS AND METHOD, AND PROGRAM STORAGE MEDIUM

CROSS-REFERENCE TO RELATED APPLICATIONS

The present application is a divisional of U.S. application Ser. No. 10/016,765, filed on Oct. 22, 2001, and claims priority to JP 2000-324015 filed on Oct. 24, 2000, the entire contents of each of which are hereby incorporated herein by reference.

BACKGROUND OF THE INVENTION

The present invention relates generally to an information processing apparatus and method and a program storage medium, and more particularly, to an information processing apparatus and method and a program storage medium for setting preset recording to a recording apparatus by use of control information recorded on a program information providing apparatus.

Recently, system services (for example, iEPG (trademark)) have begun in which television programs are preset or programmed for recording by use of program preset recording sites on the Internet. In these preset recording systems, each user accesses a program preset recording site from his personal computer and operates a preset recording button corresponding to a desired television program to download a corresponding text file described with station name, program name, and program start and end times for example.

When the program start time comes, the personal computer selects a corresponding broadcasting channel by its tuner, compresses the received data by the MPEG2 (Moving Picture Experts Group 2) standard for example, and records the compressed data to its hard disk for example. This allows each user to preset desired programs for recording only by performing necessary operations on the Internet without having to perform cumbersome operations hitherto required in preset recording programs.

However, the above-mentioned television program preset recording system services basically require a personal computer for using the services, barring generally widespread VCRs (Video Cassette Recorders), which are television program recording apparatuses, from accessing these services.

SUMMARY OF THE INVENTION

It is therefore an object of the present invention to facilitate and speed up the setting of preset recording of television programs to recording apparatuses such as VCRs.

In carrying out the invention and according to an aspect thereof, there is provided an information processing apparatus comprising: acquisition means for acquiring control information for controlling preset recording of a program from a program information providing apparatus; conversion means for converting contents described in the control information acquired by the acquisition means into code information for setting the program preset recording to a recording apparatus; and a transmission means for transmitting the code information obtained by the conversion means to the recording apparatus.

The above-mentioned code information may be the G-Code.

The above-mentioned transmission means may transmit the code information to the recording apparatus through an infrared signal.

The above-mentioned control information may include the broadcast channel information, broadcast date, and broadcast start and end times for example of the program.

In carrying out the invention and according to another aspect thereof, there is provided an information processing method comprising the steps of: acquiring control information for controlling preset recording of a program from a program information providing apparatus; converting contents described in the control information acquired by the acquisition step into code information for setting the program preset recording to a recording apparatus; and transmitting the code information obtained by the conversion step to the recording apparatus.

In carrying out the invention and according to still another aspect thereof, there is provided a program storage medium storing a computer-readable program comprising the steps of: acquiring control information for controlling preset recording of a program from a program information providing apparatus; converting contents described in the control information acquired by the acquisition step into code information for setting the program preset recording to a recording apparatus; and transmitting the code information obtained by the conversion step to the recording apparatus.

In the above-mentioned information processing apparatus and method and program storage medium, the control information for controlling the preset recording of a television program is retrieved from the program information providing apparatus and the contents of the retrieved information are converted into code information which is used to set the presetting recording of the program to the recording apparatus. The obtained code information is transmitted to the recording apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic diagram illustrating an exemplary configuration of a preset recording system practiced as one embodiment of the invention;

FIG. 13 illustrates an exemplary display of a program guide;

FIG. 14 illustrates exemplary preset recording data;

FIG. 15 illustrates an exemplary channel conversion file;

FIG. 18 illustrates an exemplary program selection screen;

FIG. 19 illustrates another exemplary program selection screen;

FIG. 20 illustrates still another exemplary program selection screen;

FIG. 21 illustrates yet another exemplary program selection screen;

FIG. 23 illustrates an exemplary television display;

FIG. 24 illustrates another exemplary television display; and

DETAILED DESCRIPTION OF THE PREFERRED EMBODIMENTS

Figure 2:
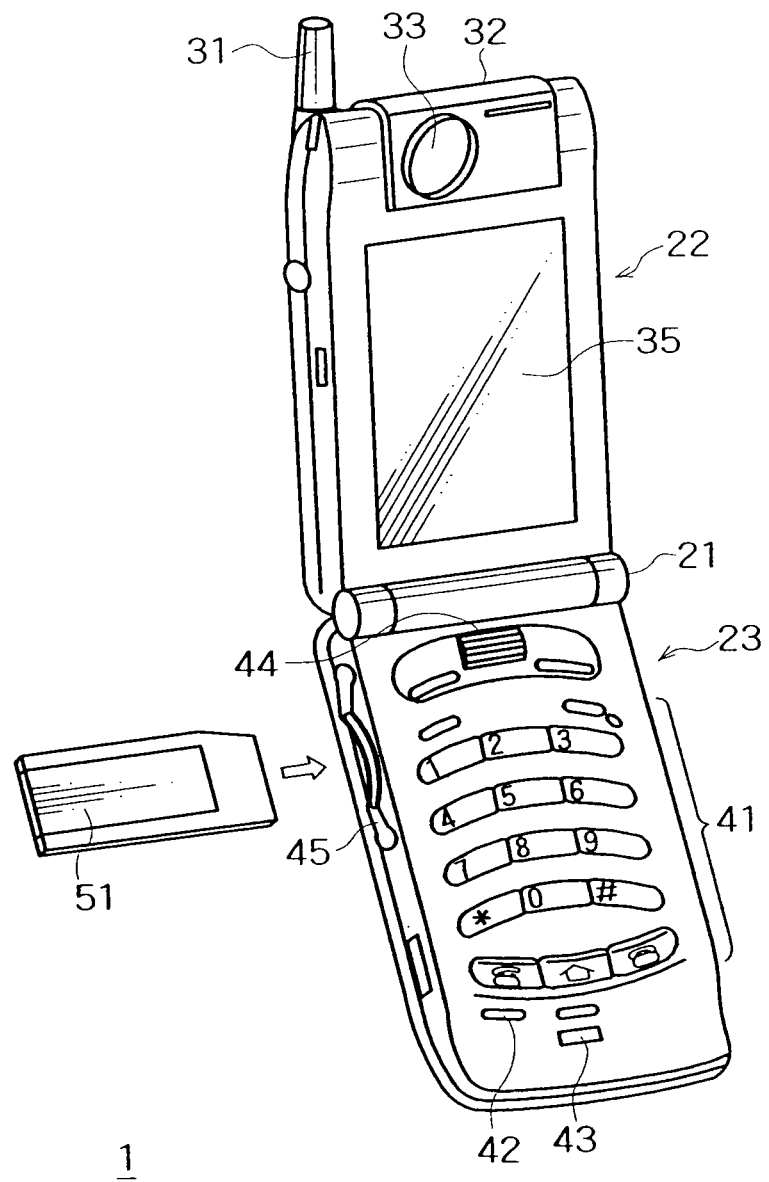
FIG. 2 is an exemplary perspective view of a camera-mounted digital mobile telephone shown in FIG. 1.

This invention will be described in further detail by way of example with reference to the accompanying drawings. Now, referring to FIG. 1, there is shown an exemplary configuration of a program preset recording system to which the present invention is applied.

A public switched line network 4 is connected to a camera-mounted digital mobile telephone (hereafter also simply referred to as a mobile telephone) 1 or a PDA (Personal Digital Assistants) 2 via a base station 3-1 or 3-2 respectively, each base station being a stationary wireless terminal arranged in a cell obtained by dividing a communication service area into predetermined sub-areas. The public switched line network 4 is also connected to a personal computer 5.

The base station 3-1 or 3-2 wirelessly connects the PDA 2 or the mobile telephone 1, by W-CDMA (Wideband-Code Division Multiple Access) for example, executing high-speed data communication at a maximum of 2 Mbps by use of 2 GHz frequency band.

The base station 3-1 or 3-2 is connected to the public switched line network 4 via a fixed-line. The public switched line network 4 is connected to an access server 6, which is an Internet service provider. Through the access server 6, the public switched line network 4 is connected to the Internet, subscriber fixed-line terminal devices, computer networks, intranets, not shown, and so on.

The Internet 7 is connected to an EPG (Electronic Program Guide) server 8, WWW (World Wide Web) servers 9-1 through 9-N, and a management control apparatus 10.

The EPG server 8 is a so-called Web server, storing, in its internal program database, a program guide listing programs to be broadcast by television stations in a predetermined area, such as Japan. The EPG server 8 also stores preset recording data which allows the user to set the preset recording of each program in the personal computer 5 for example. These preset recording data are text data which describe the broadcast date, broadcast channel, and broadcast start and end times, and so on of each program, details of which will be described later.

The Internet 7 is connected to many WWW servers 9-1 through 9N. The WWW servers 9-1 through 9N are accessed from the subscriber fixed-line terminal, the mobile telephone 1, the PDA 2, and the personal computer 5 in accordance with the TCP/IP protocol. Therefore, the EPG server 8 and the WWW servers 9-1 through 9N store not only the content corresponding to the WWW browser of the personal computer 5 but also the content corresponding to the WWW browser of the mobile telephone 1 and the PDA 2.

The management control apparatus 10, connected to the subscriber fixed-line terminal, the mobile telephone 1, the PDA 2, and personal computer 5 via the public switched line network 4, executes authentication processing and fee-charging processing on each of these terminals.

The mobile telephone 1 and the PDA 2 can communicate large quantities of data at high speeds with the base station 3-1 or 3-2 on the basis of W-CDMA, so that the users of the mobile telephone 1 and the PDA 2 can execute the transfer of electronic mail, the browsing of simplified home pages recorded on the WWW servers 9-1 through 9-N, and the transfer of image files, and other various data communications.

The personal computer 5 is supplied with signals which are obtained at an antenna 11 by converting the radio waves transmitted from a television station, not shown. Consequently, the user of the personal computer 5 can view desired television programs and record them to the hard disk for example of the personal computer 5 if required.

When setting the preset recording of a program, the user of the personal computer 5 can make the necessary settings of broadcast channel and broadcast date for example by operating the keyboard for example of the personal computer 5. Alternatively, the user of the personal computer 5 can set preset recording by accessing the EPG server 8 and using the downloaded preset recording data.

Further, the user of the personal computer 5 can set the preset recording to the VCR 12 by use of the downloaded preset recording data. In this case, the personal computer 5 converts the preset recording data into information, such as a G-Code (trademark of Gemstar Development Corp.), which the VCR 12 can recognize as the preset recording information and transmits the resultant information from a video mouse 5A connected to the personal computer 5 via a USB (Universal Serial Bus) cable 5B as an infrared signal.

Receiving the infrared signal, the VCR 12 decodes the G-Code and analyzes the broadcast date, broadcast time, broadcast channel, and program length of the program to set the preset recording thereof. Then, when the program broadcast start time comes, the VCR 12 extracts the program broadcast channel from the signal received at the antenna 11 and records the program of the extracted channel to a cassette tape loaded in the VCR 12. Therefore, the video mouse 5A is arranged in the proximity of the infrared signal receiving section of the VCR 12.

Likewise, the user operates the mobile telephone 1 and the PDA 2 to convert the preset recording data downloaded from the EPG server 8 into a G-code and transmit a corresponding infrared signal to the VCR 12, setting the preset recording.

The following describes the configuration of each of the above-mentioned devices. Referring to FIG. 2, there is shown an external view of the mobile telephone 1.

As shown in FIG. 2, the mobile telephone 1 is composed of a display section 22 and a main body 23, which are foldable to each other around a hinge 21 in between.

The display section 22 has a retractable send/receive antenna 31 at its upper left corner. The mobile telephone 1 transmits and receives signals to and from the base station 3-1 or 3-2, which is a stationary wireless terminal, via the antenna 31.

The display section 22 has, on its top center, a camera section 32 which is pivotable within an angular range of about 180 degrees. The camera-mounted digital mobile telephone 1 takes pictures by a CCD camera 33 incorporated in the camera section 32.

Figure 3:
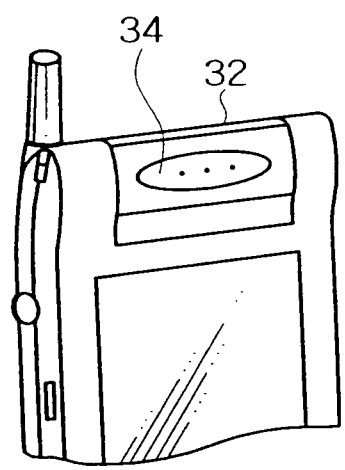
FIG. 3 is an exemplary sectional perspective view of the camera-mounted digital mobile telephone shown in FIG. 1.

When the camera section 32 is rotated by the user about 180 degrees, the display section 22 is positioned with a speaker 34 arranged at the rear center of the camera section 32 faced to the front side as shown in FIG. 3. Thus, the mobile phone 1 gets in the normal talk mode.

In addition, the display 22 has a liquid crystal display 35 at the front center section. The liquid crystal display 35 displays the contents of electronic mail, a simplified home page, and an image taken by the CCD camera 33 of the camera section 32 in addition to radio wave reception status, battery remaining amount, and names and numbers of phones registered as a telephone directory and call log.

On the other hand, the main body 23 has numeric keys "0" through "9", a call key, a redial key, a clear/power key, and other operation keys 41 on the front surface. Various commands are inputted from these operation keys 41 into the digital mobile telephone 1.

Below the operation keys 41 of the main body 23, a memo button 42 and a microphone 43 are arranged. When the memo button 42 is pressed, the digital mobile phone 1 records the voice of the other party. The digital mobile telephone 1 picks up the voice of the user in the talk mode through the microphone 43.

In addition, a rotatable jog dial 44 is arranged over the operation keys 41 on the main body 23 in a manner in which the jog dial 44 is slightly projecting from the surface of the main body 23. In accordance with the rotary operation of the jog dial 44, the digital mobile telephone 1 executes the scrolling of a telephone directory list or electronic mail messages displayed on the liquid crystal display 35, the turning of the displayed pages of simplified home page, and the feeding of displayed images, for example.

For example, the main body 23 selects a desired telephone number from among those in a telephone directory list displayed on the liquid crystal display 35 by the rotation of the jog dial 44 by the user, and when the jog dial 44 is pressed into the main body 23, enters the selected telephone number, thereby automatically originating a call to the party at the selected telephone number.

It should be noted that a battery pack, not shown, is loaded in the main body 23 at the rear side. When the clear/power key is turned on, power is supplied from the battery pack to each circuit, making the digital mobile telephone 1 ready for operation.

The main body 23 also has a Memory Stick slot 45 at the upper left side in which the detachable Memory Stick 51 is to be loaded. When the memo button 42 is pressed, the digital mobile telephone 1 records the voice of the other party into the loaded Memory Stick 51. In accordance with the operation of the user, the digital mobile telephone 1 records an electronic mail message, a simplified home page, or an image taken by the CCD camera 33 into the loaded Memory Stick 51.

The Memory Stick 51 is a kind of flash memory card developed by Sony Corporation, the applicant hereof. The Memory Stick 51 incorporates a flash memory element, one kind of EEPROM (Electrically Erasable and Programmable Read Only Memory), housed in a plastic case having dimensions of 21.5 mm×50 mm×2.8 mm. The Memory Stick allows writing and reading of various data such as images, voices, and music via a 10-pin terminal.

The Memory Stick 51 uses a proprietary serial protocol which guarantees compatibility with the devices in which it is used even if the specifications of the incorporated flash memory have been changed due to the increase in its capacity for example, realizes the high-speed performance of maximum write rate of 1.5 MB/S and maximum read rate of 2.45 MB/S, and ensures the high reliability by the provision of an error deletion preventing switch.

Consequently, the digital mobile telephone 1, configured to detachably load the Memory Stick 51, can share data with other electronic devices via the Memory Stick 51.

Figure 4:
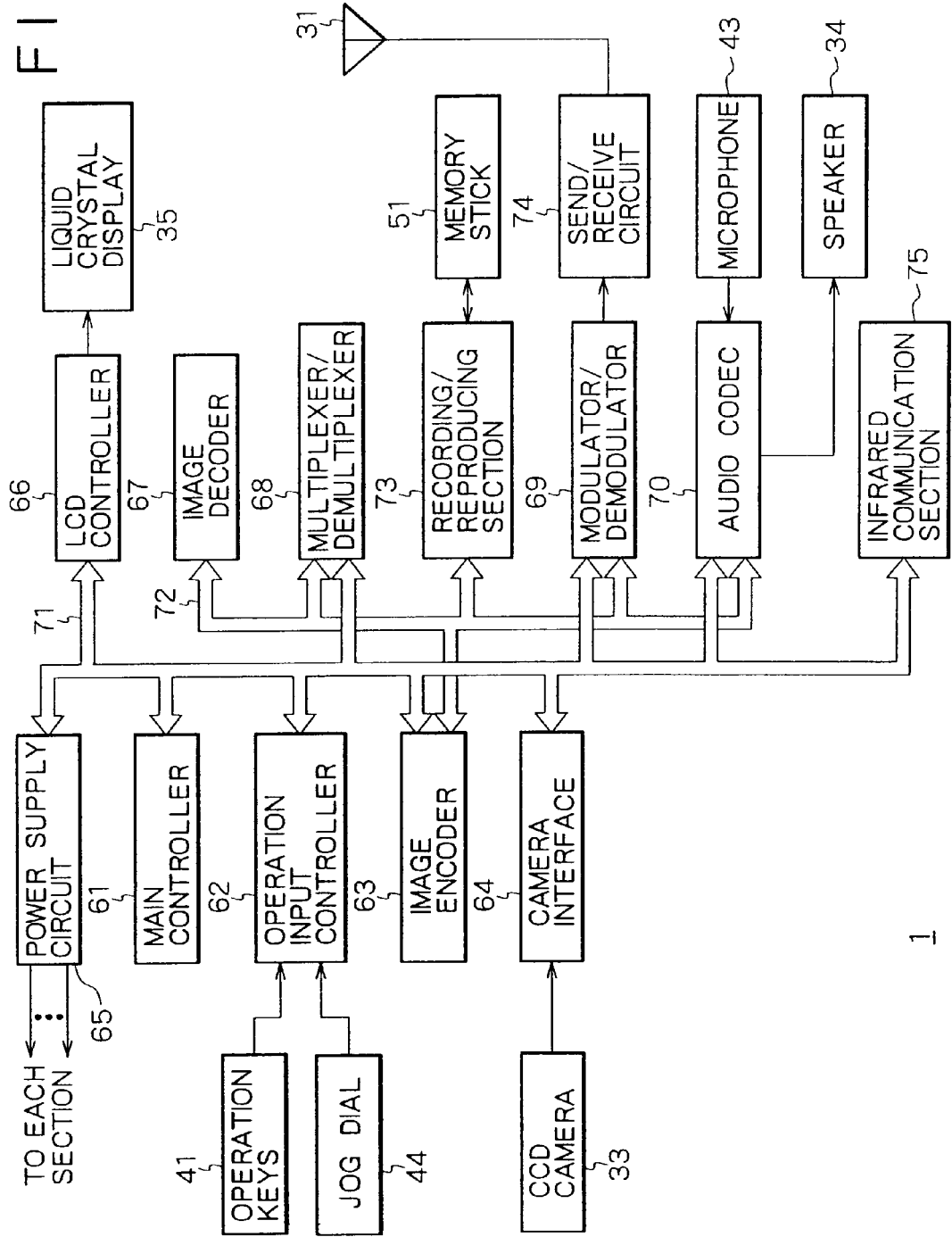
FIG. 4 is a block diagram illustrating an exemplary internal configuration of the camera-mounted digital mobile telephone shown in FIG. 1.

Referring to FIG. 4, there is shown an internal configuration of the mobile telephone 1.

As shown in FIG. 4, the digital mobile telephone 1 is configured so that a main controller 61 for centrally controlling each portions of the display section 22 and the main body 23 is connected to a power supply circuit 65, an operation input controller 62, an image encoder 63, a camera interface (I/F) 64, an LCD (Liquid Crystal Display) controller 66, a multiplexer/demultiplexer 68, a modulator/demodulator 69, audio codec 70, and an infrared communication section 75 via a main bus 71, and the image encoder 63, the image decoder 67, the multiplexer/demultiplexer 68, a recording/reproducing section 73, the modulator/demodulator 69, and the audio codec 70 are interconnected by a synchronous bus 72.

The power supply circuit 65, when the clear/power key is turned on by the user, supplies power from the battery pack to each component circuit, thereby making the digital mobile telephone 1 ready for operation.

Under the control of the main controller 61 composed of a CPU (Central Processing Unit), a ROM (Read Only Memory), and a RAM (Random Access Memory) for example, the digital mobile telephone 1 converts an audio signal picked up by the microphone 43 in the talk mode into digital audio data through the audio codec 70. The digital mobile telephone 1 performs spread spectrum on the digital audio data through a modulator/demodulator 69 and performs digital-to-analog conversion and then frequency conversion on the digital audio data through a send/receive circuit 74, sending the resultant digital audio data via the antenna 31.

The digital mobile telephone 1 amplifies a receive signal received at the antenna 31 in the talk mode, performs frequency conversion and analog-to-digital conversion on the amplified receive signal, performs spread spectrum on the converted signal through the modulator/demodulator 69, and converts the resultant signal into an analog audio signal through the audio codec 70. The digital mobile telephone 1 outputs a sound corresponding to this analog audio signal from the speaker 34.

Further, in the data communication mode, when sending electronic mail, the digital mobile telephone 1 sends the text data of electronic mail inputted from the operation keys 41 and the jog dial 44 to the main controller 61 via the operation input controller 62.

The main controller 61 performs spread spectrum on the text data through the modulator/demodulator 69 and then digital-to-analog conversion and frequency conversion through the send/receive circuit 74, sending the resultant text data to the base station 3-1 via the antenna 31.

In the data communication mode, when receiving electronic mail, the digital mobile telephone 1 performs reverse spread spectrum through the modulator/demodulator 69 on the receive signal received from the base station 3-1 via the antenna 31 to restore the original data and displays the original data on the liquid crystal display 35 through the LCD controller 66 as an electronic mail message.

Then, the mobile telephone 1 can also record the electronic mail message received in accordance with user operation to the Memory Stick 51 via the recording/reproducing section 73.

In the data communication mode, when sending image data, the digital mobile telephone 1 supplies the image data taken by the CCD camera 33 to the image encoder 63 via the camera interface 64.

When not sending image data, the digital mobile telephone 1 can also display the image data taken by the CCD camera 33 onto the liquid crystal display 35 via the camera interface 64 and the LCD controller 66.

The image encoder 63 converts the image data supplied from the CCD camera 33 into coded image data by coding and compressing based on MPEG2 (Moving Picture Experts Group 2) or MPEG4 for example and sends the coded image data to the multiplexer/demultiplexer 68.

At this moment, the digital mobile telephone 1 sends an audio signal picked up by the microphone 43 while taking the image by the CCD camera 33 to the multiplexer/demultiplexer 68 via the audio codec 70 as audio data.

The multiplexer/demultiplexer 68 multiplexes the coded image data supplied from the image encoder 63 with the audio data supplied from the audio codec 70 by a predetermined algorithm, performs spread spectrum on the resultant multiplex data through the modulator/demodulator 69, and performs digital-to-analog conversion and frequency conversion through the send/receive circuit 74, outputting the resultant data via the antenna 31.

In the data communication mode, when receiving the data of a moving image file linked with a simplified home page for example, the digital mobile telephone 1 performs reverse spread spectrum on the receive signal received from the base station 3-1 via the antenna 31 through the modulator/demodulator 69 and sends the resultant multiplex data to the multiplexer/demultiplexer 68.

The multiplexer/demultiplexer 68 divides the multiplex data into code image data and audio data, supplying the coded image data to the image decoder 67 and the audio data to the audio codec 70 via the synchronous bus 72.

The image decoder 67 generates reproduced moving image data by decoding the coded image data by the corresponding predetermined decoding algorithm such as MPEG2 or MPEG4 for example and supplies the reproduced moving image data to the liquid crystal display 35 via the LCD controller 66. Consequently, the digital mobile telephone 1 displays the moving image data contained in a moving image file linked with a simplified home page for example.

At the same time, the audio codec 70 converts the audio data into an analog audio signal and supplies it to the speaker 34. Consequently, the digital mobile telephone 1 reproduces the audio data contained in the moving image file linked with the simplified home page for example.

In this case, as with electronic mail, the digital mobile telephone 1 also can record the data linked with the received simplified home page into the Memory Stick 51 via the recording/reproducing section 73 as operated by the user.

The infrared communication section 75 transmits the data received from the main controller 61 to other devices as an infrared signal and receives an infrared signal from other devices to supply it to the main controller 61 via the main bus 71. Therefore, if the user downloads preset recording data from the EPG server 8 by operating the operation keys 41 or the jog dial 44, the preset recording data are extracted from the signal received at the antenna 31 to be transmitted to the main controller 61. The main controller 61 converts the preset recording data into a G-code. The infrared communication section 75, on the basis of a transmission command issued by the main controller 61, generates an infrared signal by driving a LED (Light Emitting Diode), not shown, in a timed relation corresponding to the G-code, transmitting the generated infrared signal to the VCR 12.

Figure 5:
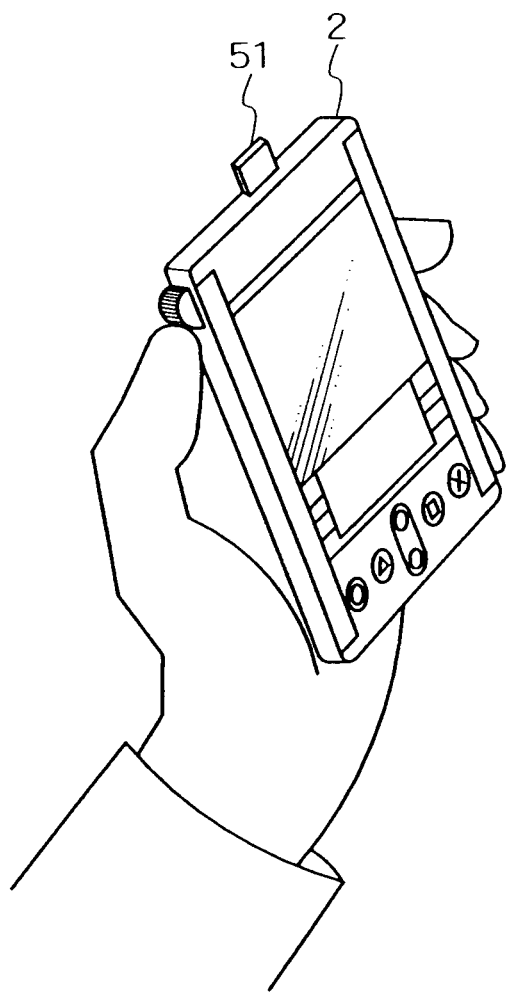
FIG. 5 is a perspective view of a PDA shown in FIG. 1.
Figure 6:
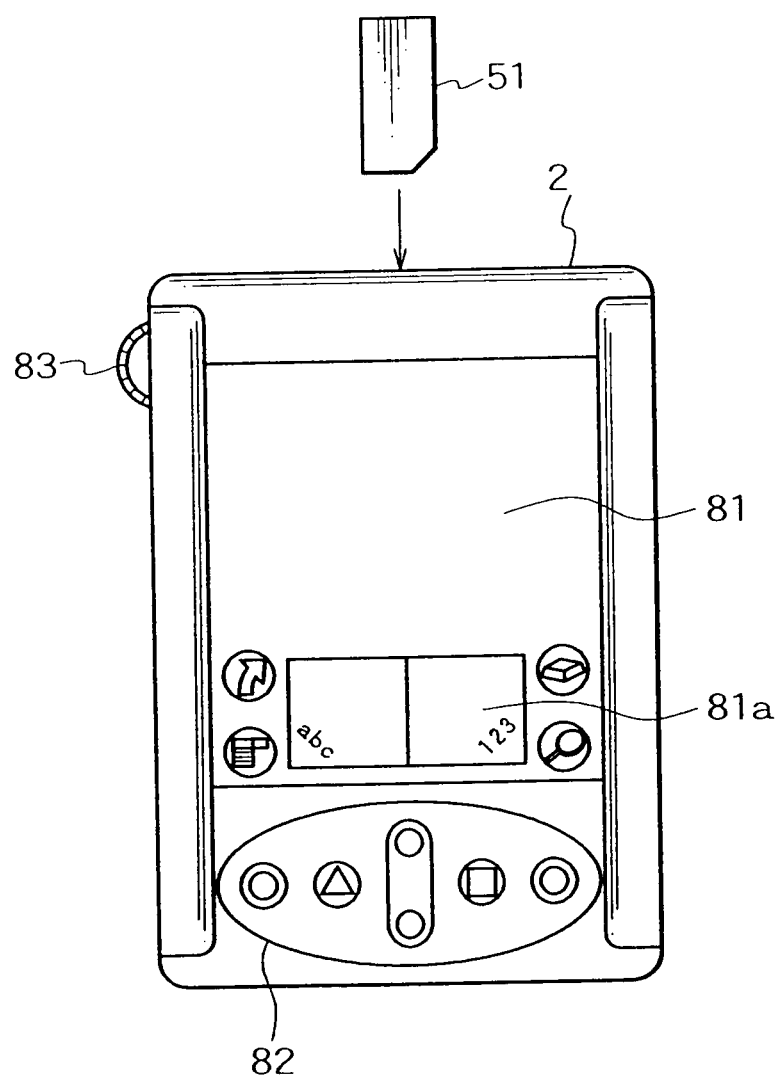
FIG. 6 is a front view of the PDA shown in FIG. 1.

Referring to FIGS. 5 and 6, there are shown external views of the PDA 2. FIG. 5 shows the perspective view of the PDA 2 held by a user. FIG. 6 shows the top view of the PDA 2.

The PDA 2 is formed so that it can be held in the single hand and operable in this state. The PDA 2 is formed at its top with a slot in which the Memory Stick 51 incorporating a semiconductor memory is inserted.

The PDA 2 is formed at its bottom with a modem, not shown, for providing connection interface with the public switched line network 4 and a USB (Universal Serial Bus) port, not shown, for transferring various kinds of data. The PDA 2 has also a display section 81, keys 82, and jog dial 83.

The display section 81 is constituted by a thin display device such as LCD, displaying icons, thumbnails, and text messages. Below the display section 81, a touch pad 81a is arranged. Pressing the touch pad 81a with a finger or a pen enters predetermined data or commands into the PDA 2.

Figure 7:
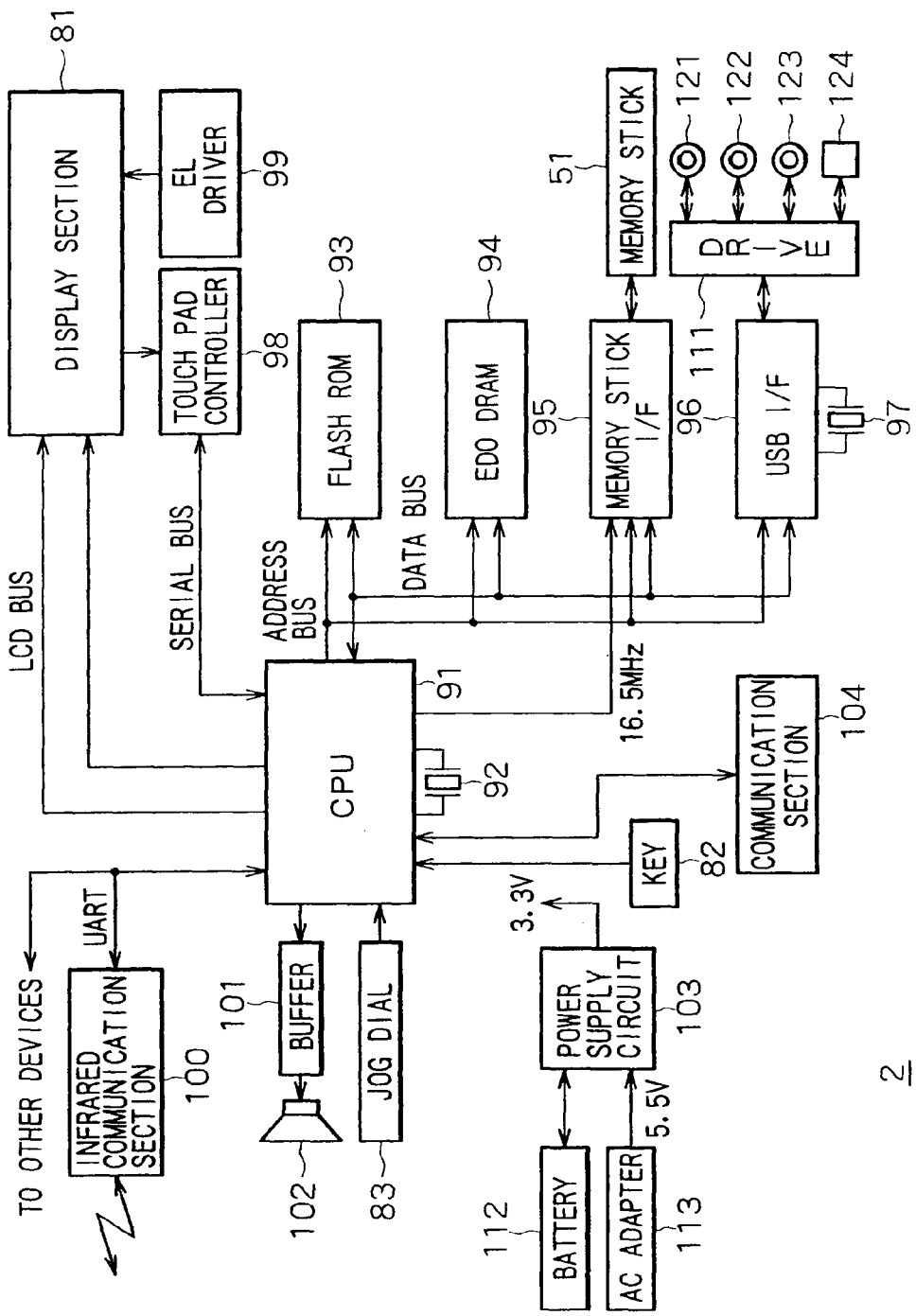
FIG. 7 is a block diagram illustrating an exemplary internal configuration of the PDA shown in FIG. 1.

The keys 82 are operated by the user when entering various commands into a CPU 91 (FIG. 7).

The jog dial 83 is rotated or pushed into the main body by the user to select an icon or a thumbnail shown on the display section 81.

FIG. 7 shows an electrical configuration of the PDA 2.

The CPU 91, in synchronization with a clock signal supplied from an oscillator 92, executes an operating system or an application program stored in a flash ROM 93 or an EDO DRAM (Extended Data Out Dynamic Random Access Memory) 94.

The flash ROM 93 is constituted by a flash memory, which is one kind of the EEPROM (Electrically Erasable Programmable Read Only Memory), generally storing basically fixed data among the computer programs and parameters for use by the CPU 91. The EDO DRAM 94 stores computer programs to be executed by the CPU 91 and the parameters which vary from time to time in the execution of these computer programs.

A Memory Stick interface (I/F) 95 reads data from the Memory Stick 51 loaded in the PDA 2 and writes data supplied from the CPU 91 thereto.

The USB interface (I/F) 96, in synchronization with a clock signal supplied from the oscillator 97, inputs data or a computer program from a drive 111, which is a USB device connected to the PDA 2 and supplies data supplied from the CPU 91 to the drive 111.

The drive 111 reads data or computer programs from a magnetic disc 121, an optical disc 122, a magneto-optical disc 123, or a semiconductor memory 124 as required to supply the data or computer programs to the CPU 91 or the EDO DRAM 94 via the USB interface 96. Also, the driver 111 stores data or computer programs into the loaded magnetic disc 121, optical disc 122, magneto-optical disc 123, or semiconductor memory 124.

The flash ROM 93, the EDO DRAM 94, the Memory Stick interface 95, and the USB interface 96 are connected to the CPU 91 via an address bus and a data bus.

The display section 81 displays an image or a text corresponding to the data received from the CPU 91 via an LCD bus. A touch pad controller 98, when the touch pad 81a arranged under the display section 81 is operated by the user, receives the data specified by the user (for example, the coordinates indicative of a touch point) from the display section 81 and transmits a corresponding signal to the CPU 91 via a serial bus.

An EL (Electro Luminescence) driver 99 operates an electro-luminescence element arranged on the rear side of the liquid crystal device of the display section 81 to control the brightness of the display section 81.

An Infrared communication section 100 transmits, by use of infrared signal, data received from the CPU 91 to other devices, not shown, via a UART (Universal Asynchronous Receiver-Transmitter) and transmits data supplied, by use of infrared signal, from other devices to the CPU 91. The PDA 2 can communicate with other devices via the UART.

Namely, when the user operates the PDA 2 to get preset recording data from the EPG server 8 to perform the preset recording on the VCR 12, the infrared signal including the G-code generated by the conversion of the preset recording data is transmitted from the infrared communication section 100.

An audio reproducing section 102, composed of a speaker and an audio data decoder for example, decodes the audio data stored beforehand or received from other devices for example, and reproduces and sounds the reproduced audio data. For example, the audio reproducing section 102 reproduces the audio data supplied from the CPU 91 via a buffer 101 to sound the reproduced audio data.

A power supply circuit 103 converts the voltage of power supplied from a battery 112 or an AC (Alternating Current) adapter 113 and supplies the resultant voltage to the above-mentioned circuits, the CPU 91 through the audio reproducing section 102.

A communication section 104, connected to the Internet 7 for example, stores the data (for example, electronic mail) supplied from the CPU 91 into a predetermined packet and transmits the packet to other devices via the Internet 7. Also, the communication section 104 outputs the data or computer programs stored in a packet received from other devices via the Internet 7 to the CPU 91.

Figure 8:
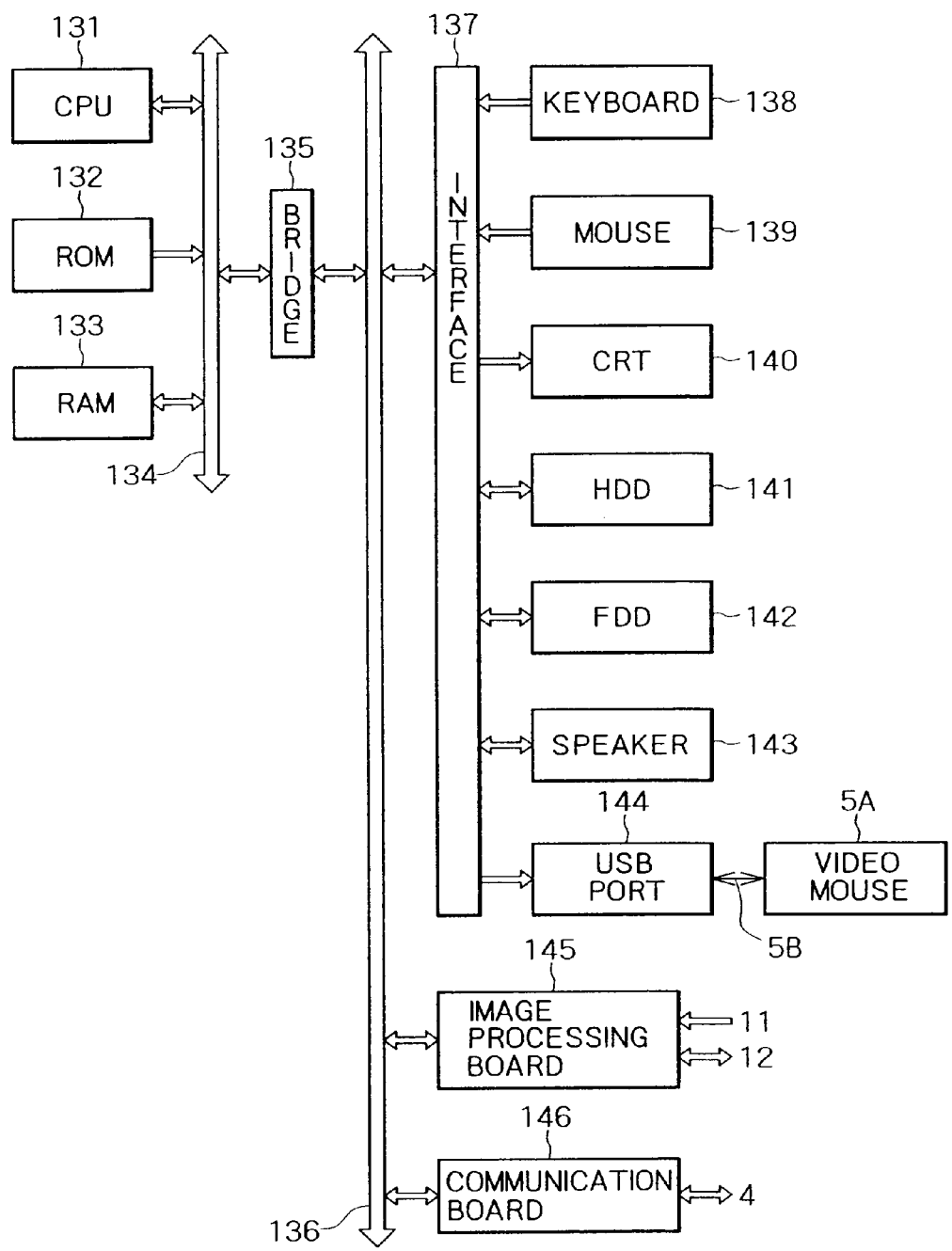
FIG. 8 is a block diagram illustrating an exemplary configuration of a personal computer shown in FIG. 1.

Referring to FIG. 8, there is shown a configuration of the personal computer 5.

A CPU (Central Processing Unit) 131 actually executes various application programs and a basic OS (Operating System). A ROM (Read Only Memory) 132 generally stores computer programs and basically fixed data of computational parameters to be used by the CPU 131. The RAM 133 stores computer programs to be used by the CPU 131 in its execution and parameters which change from time to time in the execution. The CPU 131, the ROM 132 and the RAM 133 are connected to each other via a host bus 134 consisted of a CPU bus or a memory bus, for example.

The host bus 134 is connected to an external bus 136 such as a PCI (Peripheral Component Interconnect/Interface) bus via a bridge 135.

A keyboard 138 is operated by the user to enter various commands into the CPU 131. A mouse 139 is operated by the user to specify or select points on the screen shown on a CRT (Cathode Ray Tube) display 140. The CRT display 140 displays various kinds of information in text and image.

A HDD (Hard Disk Drive) 141 and a FDD (Floppy Disk Drive) 142 drive a hard disc and a floppy disc respectively to record programs (for example, a WWW browser 191, a preset recording setting program 192, a G-code conversion program 193 to be described later) and information or reproduce these programs and information from these recording media.

A speaker 143 sounds a predetermined audio signal. These components, the keyboard 138 through the speaker 143, are connected to an interface 137 which is connected to the CPU 131 via the external bus 136, the bridge 135, and the host bus 134.

The personal computer 5 is also connected to the video mouse 5A. The video mouse 5A is connected to the personal computer 5 via the USB cable 5B connected to a USB port 144 which is connected to the interface 137 in the same way as other processing sections.

An image processing board 145 is connected to the CPU 131 via the external bus 136, the bridge 135, and the host bus 134, and under the control of the CPU 131, generates predetermined image or audio data on the basis of the signal supplied from the antenna 11, outputting the generated data to the hard disk drive 141 via the external bus 136 and the interface 137.

A communication board 146 connects the personal computer 5 to the public switched line network 4. To be more specific, the communication board 146 is constituted by an Ethernet board for example which is connected to the CPU 131 via the external bus 136, the bridge 135, and the host bus 134.

Figure 9:
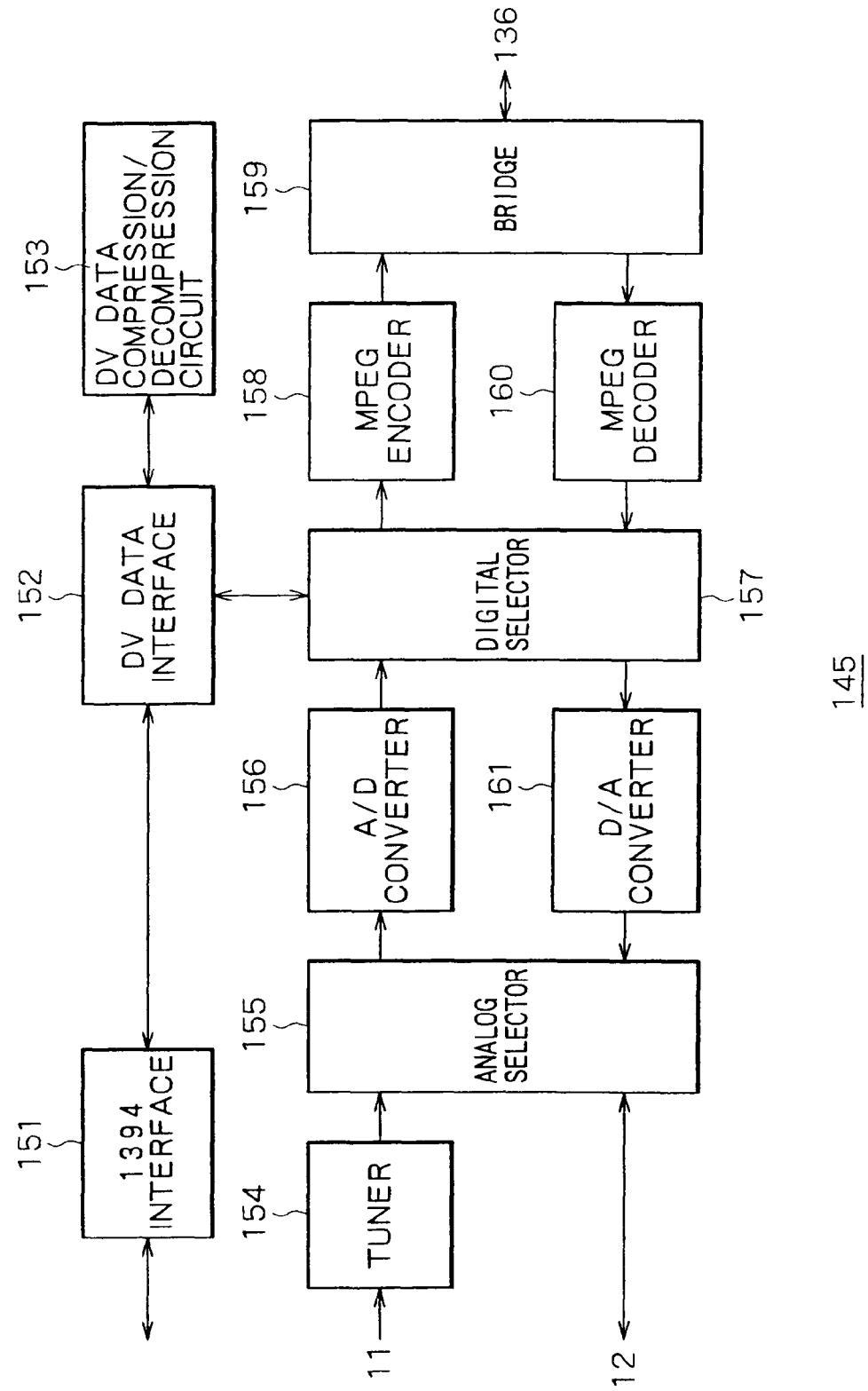
FIG. 9 is a block diagram illustrating an exemplary configuration of an image processing board shown in FIG. 8.

The following describes a detailed configuration of the image processing board 145 with reference to FIG. 9.

A 1394 interface 151 receives digital image or audio data of DVCR (Digital Video Cassette Recorder) format supplied from such a device having an output configuration compliant with the IEEE 1394 standard as a DVCR, not shown, and supplies the received data to a DV (Digital Video) data interface 152.

The 1394 interface 151 supplies digital image or audio data of DVCR format supplied from the DV data interface 152 to the DVCR on the basis of a protocol compliant with the IEEE 1394 standard.

The DV interface 152 outputs the digital image or audio data of DVCR format supplied from the 1394 interface 151 or the digital image or audio data (for example, 4:1:1 digital data not compressed) supplied from a digital selector 157 to a DV data compression/decompression circuit 153, the digital image or audio data of DVCR format supplied from the DV data compression/decompression circuit 153 to the 1394 interface 151, and the non-compressed digital image or audio data supplied from the DV data compression/decompression circuit 153 to the digital selector 157.

The DV data compression/decompression circuit 153 decompresses the digital image or audio data of DVCR format supplied from the DV data interface 152 to output the decompressed data to the DV data interface 152 or compresses the non-compressed digital image or audio data supplied from the DV data interface 152 to output the compressed data to the DV data interface 152.

A tuner 154 inputs an RF (Radio Frequency) signal supplied from the antenna 11 and outputs an analog image or audio signal of a predetermined channel to an analog selector 155. The analog selector 155 selects one of the analog image and audio signals supplied from the tuner 154, the VCR 12, or a D/A (Digital-to-Analog) converter 161 and outputs the selected signal to an A/D (Analog-to-Digital) converter 156 or the VCR 12.

The A/D converter 156 converts an analog image or audio signal supplied from the analog selector 155 into digital data and outputs the digital data to a digital selector 157. The digital sector 157 inputs the digital image and audio data supplied from the DV data interface 152, the A/D converter 156, or an MPEG decoder 160 to select one of the digital image and audio data and outputs the selected data to the DV data interface 152, an MPEG encoder 158, or the D/A converter 161, and the bridge 159.

The MPEG encoder 158 compresses the digital image and audio data supplied from the digital selector 157 into MPEG digital data and outputs the compressed data to the bridge 159. The MPEG encoder 158 also converts a scene change image into a still image and outputs the still image to the bridge 159.

The bridge 159 outputs the non-compressed digital image and audio data supplied from the digital sector 157 to the CRT display 140 via the PCI bus 136 and the interface 137 of the personal computer 5 on which the image processing board 145 is installed. The bridge 159 outputs the digital image or audio data of MPEG format supplied from the MPEG encoder 158 to the hard disk drive 141 or the CPU 131 via the PCI bus 136 of the personal computer 5 having the image processing board 145. Further, the bridge 159 receives the digital image or audio data of MPEG format from the hard disk drive 141 of the personal computer 5 and outputs the received data to the MPEG decoder 160.

The MPEG decoder 160 decompresses the digital image or audio data of MPEG format supplied from the bridge 159 and outputs the decompressed data to the digital selector 157.

The D/A converter 161 converts the digital image and audio data supplied from the digital selector 157 into analog signals and outputs the analog signals to the analog selector 155.

It should be noted that the processing by the MPEG encoder 158 or the MPEG decoder 160 may be assumed by the CPU 131 by use of a predetermined computer program.

Figure 10:
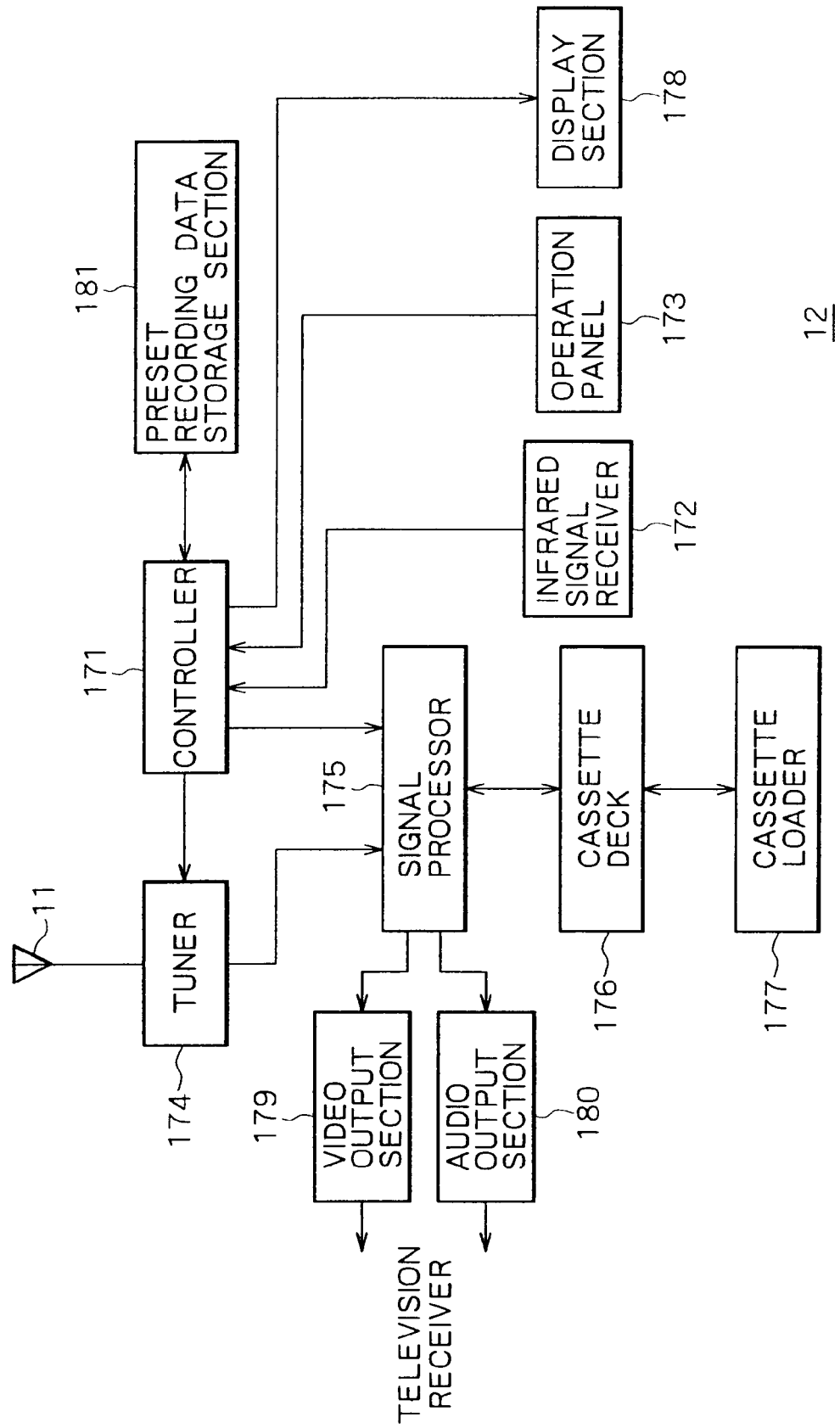
FIG. 10 is a block diagram illustrating an exemplary configuration of a VCR shown in FIG. 1.

Referring to FIG. 10, there is shown an internal configuration of the VCR 12.

A controller 171 has a CPU, a ROM, and a RAM, not shown, and controls the entire operation of the VCR 12. The controller 171 performs various control operations on the basis of the signals received at its infrared signal receiver 172 or the commands inputted by the user from an operation panel 173.

A tuner 174 inputs an RF signal supplied from the antenna 11, demodulates the analog image and audio signals (program signals) of a user-specified channel, and outputs the demodulated signals to a signal processor 175.

The signal processor 175 processes the program signal supplied from the tuner 174 under the control of the controller 171. For example, when the user specifies the recording of a program through a remote controller for example, the signal processor 175 records the program signal supplied from the tuner 174 to a video cassette, not shown, loaded in a cassette loader 177 by driving a cassette deck 176.

The cassette deck 176 records a signal supplied from the signal processor 175 to the video cassette loaded in the cassette loader 177. The cassette deck 176 reads a recorded signal from a video cassette and supplies the signal to the signal processor 175.

A display section 178 displays an operational status for example of the VCR 12 on the basis of the commands issued by the controller 171.

The signal processor 175 supplies a program signal supplied from the tuner 174 or a video signal extracted from a program signal recorded to a video cassette to a video output section 179 and an audio signal thus obtained to an audio output section 180. The video output section 179 and the audio output section 180 output the supplied signals to a television receiver, not shown.

The VCR 12 has a preset recording data storage section 181. The preset recording data storage section 181 stores the preset recording data (including broadcast date, broadcast channel, broadcast start time, and broadcast length of time, for example) obtained by decoding by the controller 171 the G-code supplied from the infrared signal receiver 172.

Therefore, the controller 171 checks the preset recording data stored in the preset recording data storage section 181 to determine whether to start recording.

It should be noted that the configuration of each of the access server 6, the EPG server 8, the WWW servers 9-1 through 9-N, and the management control apparatus 10 is basically the same as the configuration of the personal computer 5 and therefore will not be described herein.

Figure 11:
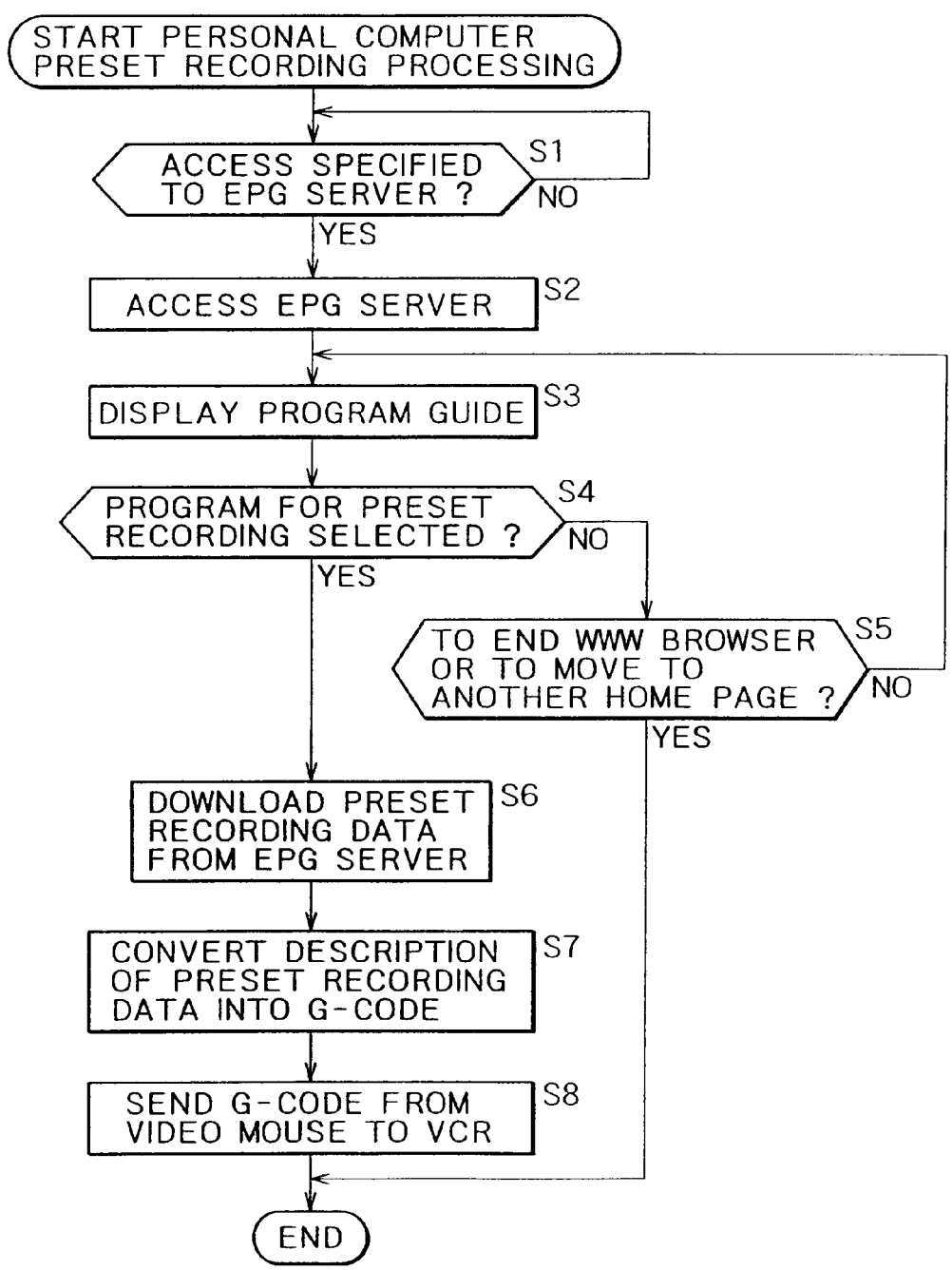
FIG. 11 is a flowchart for describing the processing by the personal computer.

The following describes an operation of the preset recording system to be performed when the user accesses the EPG server 8 through the personal computer 5 to set the preset recording on the VCR 12, with reference to the flowchart shown in FIG. 11. It should be noted that, in what follows, a drawing (FIG. 12) for describing the computer programs to be executed by the personal computer 5, a drawing (FIGS. 13 and 14) for describing exemplary screens to be displayed on the CRT 140 of the personal computer 5, and a drawing (FIG. 15) for describing one example of preset recording data will be appropriately referenced.

In step S1, the CPU 131 determines whether the user has specified access to the EPG server 8 and waits until the access is found specified.

Namely, the user uses the preset recording data stored in the EPG server 8, and if the user wants to set the preset recording on the VCR 12, starts the WWW browser 191 (FIG. 12) and enters a command to access the EPG server 8 from the keyboard 138 or the mouse 139. In response, the CPU 131 recognizes that the access to the EPG server 8 has been specified, upon which the procedure goes to step S2.

In step S2, the CPU 131 accesses the EPG server 8 via the public switched line network 4, the access server 6, and the Internet 7. Consequently, the CPU 131 executing the WWW browser 191 receives an HTML file from the EPG server 8 in step S3 and displays a program guide as shown in FIG. 13 on the CRT display 140.

The program guide shown in FIG. 13 has download buttons 201-1 through 201-11 for downloading predetermined preset recording data in correspondence with each program.

For example, when the download button 201-1 is selected, the preset recording data for preset recording "7 O'clock News" of NHK (trademark) General are downloaded to the personal computer 5 or when the download button 201-2 is selected, the preset recording data for preset recording "TV Map" of NHK General are downloaded to the personal computer 5. Likewise, when any of the download buttons 201-3 through 201-11 is selected, the preset recording data of the corresponding program are downloaded.

In step S4, the CPU 131 executing the WWW browser 191 determines whether the program to be preset recorded has been selected, namely, any one of the download buttons 201-1 through 201-11 has been selected.

If the program for preset recording is found not selected, the procedure goes to step S5, in which the CPU 131 determines whether the closing of the WWW browser has been specified by the user or the move to another home page has been specified by the user. If the closing of the WWW browser or the move to another home page has been specified from the keyboard 138 or the mouse 139, the CPU 131 ends the preset recording processing. Then, the CPU 131 executes the processing specified by the user.

On the other hand, if the closing of the WWW browser 191 or the move to another home page has not been specified in step S4, then the procedure returns to step S3 to continue the program guide display processing.

If any one of the download buttons has been selected by the user from the keyboard 138 or the mouse 139 in step S3, the CPU 131 executing the WWW browser 191 recognizes that the program to be preset recorded has been selected, upon which the procedure goes to step S6.

Figure 12:
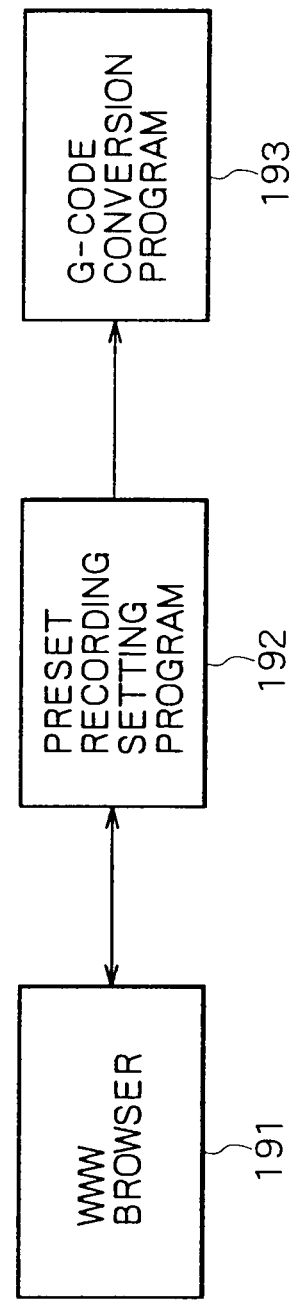
FIG. 12 illustrates application programs to be executed by the personal computer.

In step S6, the CPU 131 executing the WWW browser 191 downloads the preset recording data of TVPI (TeleVision Program Information) format from the EPG server 8. At this moment, as shown in FIG. 12, a preset recording setting program 192 is started and the downloaded preset recording data are passed thereto for analysis and extraction of the data necessary for preset recording.

Referring to FIG. 14, there is shown one example of the preset recording data of TVPI format. The preset recording data are made up of text data. It should be noted that the preset recording data shown in FIG. 14 are downloaded by selecting the download button 201-10 shown in FIG. 13.

In this example, "Subject:TVPI200006021900" indicates a control command for this data to be record. "Content-type: application/x-tv-program-info;charaset=shift_jis" on the second line of the preset recording data indicates that this data is preset recording data. On the fourth line of the preset recording data, "station:" is followed by the data for identifying a channel to be recorded. For example, in "station: Nihon TV" in FIG. 14, the identification data is "Nihon TV."

The channel identification data allows an ambiguous description within a predetermined range. The ambiguously described data are converted by the processing using a channel conversion file shown in FIG. 15 into the data for identifying a predetermined channel (or station).

In a character string "4,0,0,4 Nihon TV, Nihon TV, Nittele, Nihon TV Broadcast Network, NTV (trademarks)" for example in the channel conversion file, the leftmost "4" is the data for channel identification, the rightmost "4" is channel display data, and the first "Nihon TV" is data for display channel name. The following "Nihon TV, Nittele, Nihon TV Broadcast Network, NTV" is a character string for taking a match with a predetermined character string in the channel conversion file.

For example, if "station: Nihon TV" is written on the fourth line of the preset recording data, the CPU 131 executing the preset recording setting program 192 determines whether "Nihon TV" following "station:" matches the character string located to the right of the fifth comma from the left in the channel conversion file.

As shown in the example of FIG. 15, if the channel conversion file includes the character string "4,0,0,4, Nihon TV, Nihon TV, Nittele, Nihon TV Broadcast Network, NTV", then the CPU 131 executing the preset recording setting program 192 determines that there is a match between the character string "Nihon TV" (located to the right of the fifth comma from the left) and the character string in the channel conversion file.

If a match is found between the character string of the preset recording data and the character string of the channel conversion file, the CPU 131 executing the preset recording setting program 192 recognizes, as a channel, the channel identification data on the same row in the matching channel conversion file.

Therefore, if the character string for specifying the channel of preset recording data is any one of "Nihon TV", "Nittele", "Nihon TV Broadcast Network", and "NTV" for example, the CPU 131 executing the preset recording setting program 192 can recognize the channel as "4" on the basis of the preset recording data.

Thus, even if the character string for a channel of the preset recording data is ambiguous to a certain degree, the CPU 131 executing the preset recording setting program 192 can recognize a predetermined channel on the basis of the preset recording data.

Likewise, the fifth through eighth lines of the preset recording data are written with the data for identifying recording start date and time and the ninth line is written with the data for identifying recording end time.

In the example shown in FIG. 14, recording start date is "Jun. 2, 2000", recording start time is "19:00" and recording end time is "20:54". On the basis of this information, the CPU 131 executing the preset recording setting program 192 can recognize the broadcast channel, broadcast date, broadcast start time, and broadcast length of time necessary for preset recording.

Returning to the description with reference to FIG. 11, the preset recording data as described above downloaded in step S6 are received by the communication board 146 via the Internet 7 and so on to be transferred to the CPU 131.

In step S7, the CPU 131 executing the preset recording setting program 192 starts a G-code conversion program 193 as shown in FIG. 12 to convert the preset recording data of TVPI format downloaded and analyzed in step S6 into a G-code.

G-code is used in VCR Plus (trademark) of Gemstar Development Corp., in which such data necessary for program preset recording setting as "program broadcast date", "program broadcast channel", "program start time", and "program recording length of time" into a code of up to 8 digits in the VCR 12 for example.

If the above-mentioned four elements are decimally expressed without compression (it is assumed that a maximum number of broadcast channels be 99, a maximum number of broadcast hours of one program be 8, and the program start time and the program recording length of time be in units of 5 minutes each), a total number or programs can be expressed in a 10-digit number. Weighting such as "whether program broadcast time is in the morning or not", "whether the program length is less than 1 hour or not", or "whether the program is started just on time (for example, 7:00, 7:30, and so on) or not", four basic operations of arithmetic, or data compression is performed on the above-mentioned 10-digit number to generate a G-code.

The settings for preset recording are different from maker to maker and from model to model. And it is complicated to enter the above-mentioned four elements. However, use of G-code allows the user to easily set the preset recording of television programs without being aware of the maker and model differences of the VCR 12. It should be noted that the G-code conversion is disclosed in U.S. Pat. No. 5,307,173.

Therefore, in step S7, the CPU 131 executing the G-code conversion program 193 first analyzes the contents of the preset recording data of TVPI format obtained in step S6. In the example of the preset recording data shown in FIG. 14, the CPU 131 finds from the preset recording data that the number of broadcast channels is "4", the recording start date is "Jun. 2, 2000", the program start time is "19:00", the program end time is "20:54" to generate a G-code by following the above-mentioned procedure.

In step S8, the CPU 131 transmits the G-code generated in step S7 from the video mouse 5A to the VCR 12. Namely, the G-code generated by the CPU 131 is transferred to the interface 137 to be transferred to the video mouse 5A via the USB port 144 and the USB cable 5B.

The video mouse 5A drives its LED, not shown, to emit light in a light emitting pattern corresponding to the received G-code (up to 8 decimal digits) to generate an infrared signal which represents the G-code and transmits the generated infrared signal to the infrared signal receiver 172 of the VCR 12.

Then, the preset recording processing in the personal computer 5 comes to an end, upon which the CPU 131 closes the WWW browser 191 as specified by the user.

Consequently, the user can set preset recording on the G-code compatible VCR 12 without checking the television guides on a newspaper or the like. If the preset recording data stored in the EPG server 8 do not correspond to the preset recording program stored in the VCR 12, preset recording can be made as long as the VCR 12 is compatible with G-code.

It should be noted that the user of the personal computer 5 can also perform preset recording in the personal computer 5 by use of the above-mentioned preset recording data of TVPI format. In this case, when the program broadcast time has come, the CPU 131 executing the preset recording setting program 192 causes the image processing board 145 to compress, in the MPEG standard for example, the program signal received at the antenna 11 and record the compressed program signal to the HDD 141.

Figure 16:
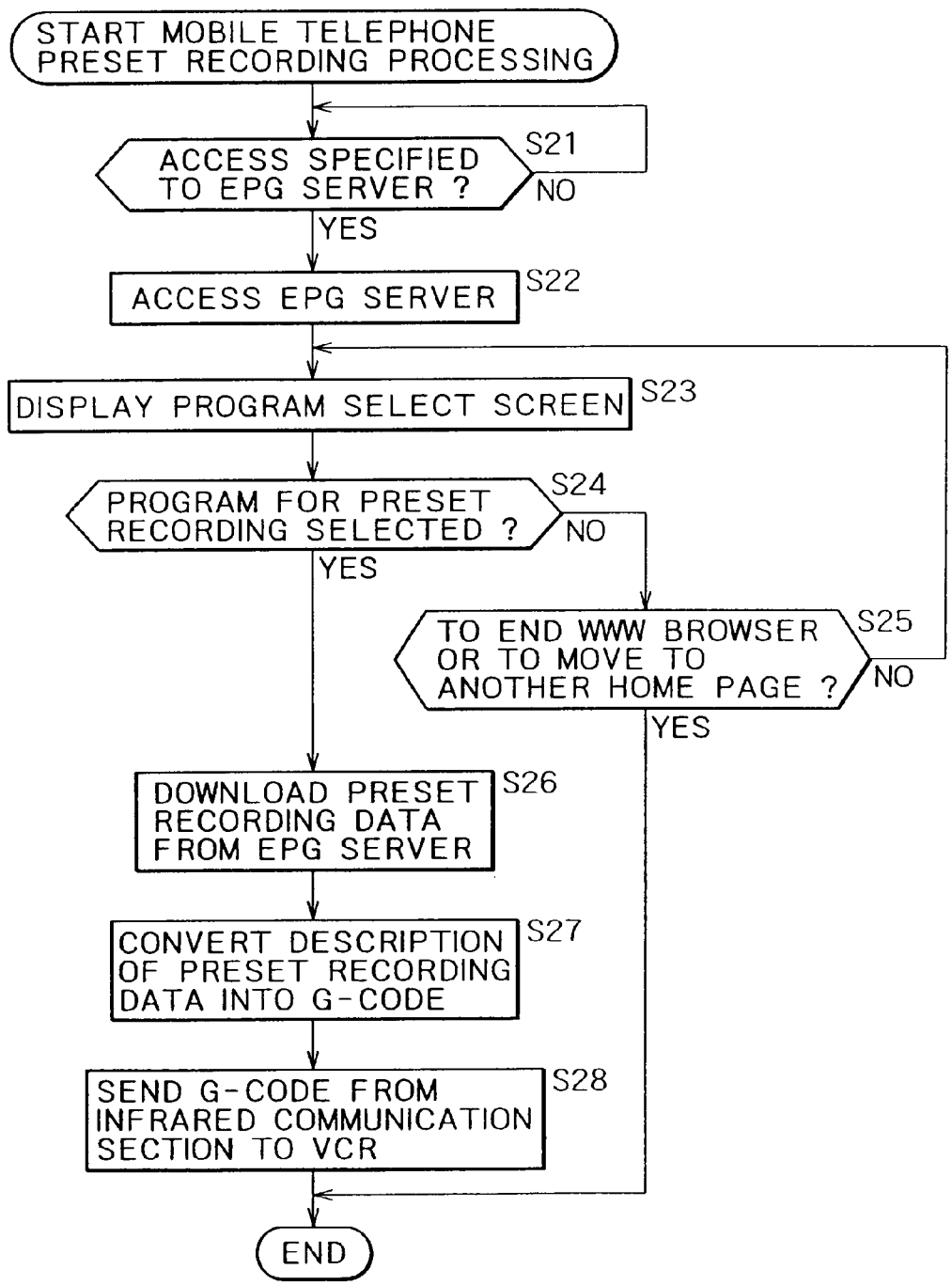
FIG. 16 is a flowchart for describing the processing of the camera-mounted digital mobile telephone.

The following describes the processing for setting preset recording on the VCR 12 by use of the mobile telephone 1 by the user with reference to the flowchart shown in FIG. 16.

Figure 17:
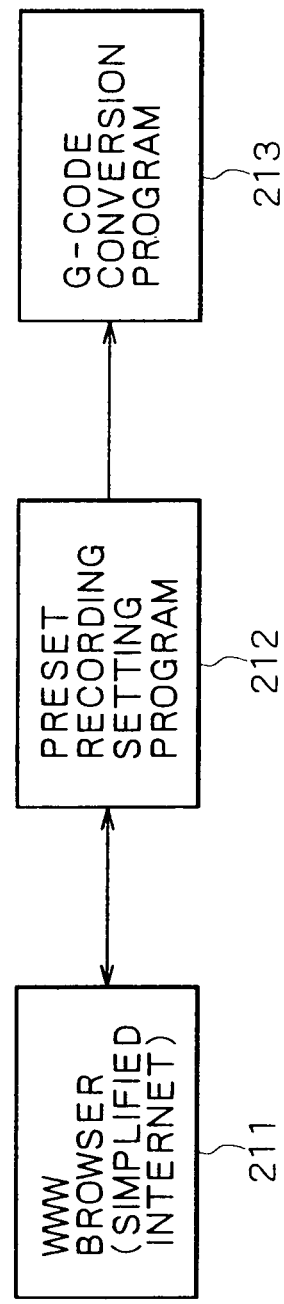
FIG. 17 illustrates application programs to be executed by the camera-mounted digital mobile telephone.

The preset recording by use of the mobile telephone 1 is performed basically in the same manner as the preset recording in the personal computer 5 described with reference to the flowchart shown in FIG. 11. Namely, the main controller 61 of the mobile telephone 1 has basically the same computer programs as those of the CPU 131 shown in FIG. 12. That is, as shown in FIG. 17, the main controller 61 of the mobile telephone 1 has a WWW browser 211, a preset recording setting program 212, and a G-code conversion program 213.

Unlike the WWW browser stored in the personal computer 5, the WWW browser 211 corresponds to the simplified Internet. When the main controller 61 executes the WWW browser 211, the processing shown in FIG. 16 starts.

In step S21, the main controller 61 executing the WWW browser 211 determines whether access to the EPG server 8 has been specified or not. The EPG server 8 stores not only the program data corresponding to the WWW browser 191 of the personal computer 5, but also the program data corresponding to the WWW browser 211 of the mobile telephone 1.

The main controller 61 waits until access to the EPG server 8 is specified. When the user specifies the access by operating the jog dial 44 or the operation keys 41, the procedure goes to step S22.

In step S22, the main controller 61 accesses the EPG server 8 via the public switched line network 4, the access server 6, and the Internet 7. Consequently, the main controller 61 executing the WWW browser 211 receives a file provided by the EPG server 8, and in step S23, controls the LCD controller 66 to display program select screens as shown in FIGS. 18 through 21 on the liquid crystal display 35.

A category selection screen shown in FIG. 18 displays categories such as "Today's Programs" providing information about the programs to be broadcast today, "Tomorrow's Programs" providing information about the programs to be broadcast tomorrow, "Service Agreements" providing information about the agreements associated with the preset recording service, and "Description of Functions" providing information about the various functions of the preset recording service.

For example, if the user selects category "Tomorrow's Programs" in the category selection screen shown on the liquid crystal display 35 by use of the jog dial 44, the main controller 61 receives a compact HTML file from the EPG server 8 to display the category selection screen associated with "Tomorrow's Programs" as shown in FIG. 19 on the liquid crystal display 35.

The category selection screen shown in FIG. 19 shows "Movie" providing information about movie programs to be broadcast tomorrow, "Drama" providing information about drama programs to be broadcast tomorrow, "Sports" providing information about sports to be broadcast tomorrow, "Music" providing information about music programs to be broadcast tomorrow, "Variety" providing information about variety show programs to be broadcast tomorrow, "Daily Life and Hobby" providing information about daily life and hobby programs to be broadcast tomorrow, "Society and News Report" providing information about society and news report programs to be broadcast tomorrow, and "Culture" providing information about culture programs to be broadcast tomorrow.

For example, if the user selects category "Sports" in the category selection screen displayed on the liquid crystal display 35 by use of the jog dial 44, the main controller 61 receives a compact HTML file from the EPG server 8 to display a program information screen about "sports" as shown in FIG. 20 on the liquid crystal display 35.

The category selection screen of FIG. 20 shows the categories "Olympics 07:55 a.m." to be selected when viewing the information about an Olympic game to be broadcast at 7:55 a.m., "Olympics 08:35 a.m." to be selected when viewing the information about an Olympic game to be broadcast at 8:35 a.m., "News 10:00 a.m." to be selected when viewing the information about a news program to be broadcast at 10:00 a.m., and "Professional Baseball 19:00 p.m." to be selected when viewing the information about a professional baseball game to be broadcast at 7:00 p.m.

For example, if the user selects category "Professional Baseball 19:00 p.m." in the category selection screen displayed on the liquid crystal display 35 by use of the jog dial 44, then the main controller 61 receives a compact HTML file from the EPG server 8 and displays a program information screen associated with "Professional Baseball" as shown in FIG. 21 on the liquid crystal display 35.

The program information screen shown in FIG. 21 displays detailed information about professional baseball. Below it, a download button 221 is arranged for downloading the preset recording data of programs displayed on this program information screen. In step S24, the main controller 61 determines whether this download button 221 has been selected or not.

If the download button 221 is found not selected in step S24, then the main controller 61 determines in step S25 whether the closing of the WWW browser 211 or the move to another simplified home page has been specified by the user.

If the closing of the WWW browser 211 or the move to another simplified home page is found specified, the main controller 61 ends the processing. If the end of the preset recording processing is found not specified, the procedure returns to step S23 to continue the above-described program selection screen display operation.

On the other hand, if the download button 221 is found selected in step S24, then the main controller 61 starts the downloading in step S26. At this moment, the preset recording setting program 212 (FIG. 17) is started. The preset recording setting program 212 is generally the same in function as the preset recording setting program 192 executed by the CPU 131 of the personal computer 5 and reads the contents of the preset recording data stored in the EPG server 8.

For example, if the user executes preset recording of a "Professional Baseball" program shown in FIG. 21, the main controller 61, in response to the selecting of the download button 221, requests the EPG server 8 for the transmission of the corresponding preset recording data.

In step S27, the main controller 61 starts the G-code conversion program 213 to convert the preset recording data of TVPI format downloaded in step S26 into a G-code in the same manner as with the personal computer 5.

In the example shown in FIG. 21, the main controller 61 recognizes that the broadcast channel of this program is "Nihon TV (channel 4)", the broadcast date is "Sep. 29, 2000", the program start time is "19:00" and the program end time is "20:54" and generates a G-code by performing the basic four operations of arithmetic and data compression on the recognized data.

In step S28, the main controller 61 instructs the infrared communication section 75 to transmit the G-code generated in step S27 to the VCR 12. Then, the infrared communication section 75 causes its light emitting diode to emit light in a light emitting pattern corresponding to the received G-code (up to 8 decimal digits) to generate an infrared signal which represents the G-code and transmits the generated infrared signal to the infrared signal receiver 172 of the VCR 12.

Then, the main controller 61 closes the WWW browser 201 and so on as instructed by the user to end the preset recording processing.

If the PDA 2 has a browser which is basically the same in function as the WWW browser 211 of the mobile telephone 1, the user of the PDA 2 can perform the same processing as the preset recording processing of the mobile telephone 1 to perform preset recording of programs on the VCR 12. Normally, in the PDA 2, a simplified home page is displayed after being converted into PDA 2 display format.

Figure 22:
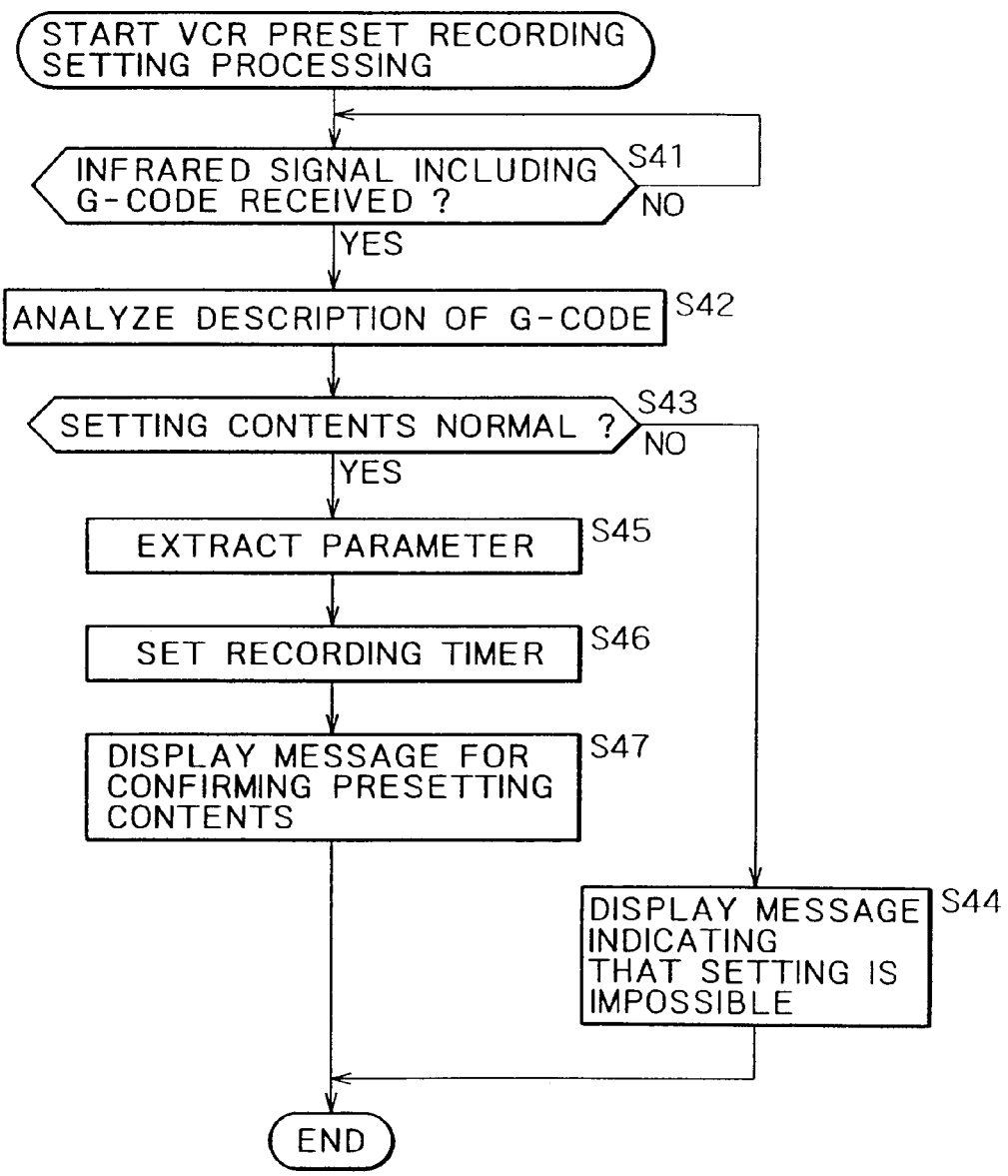
FIG. 22 is a flowchart for describing a processing operation of the VCR.

The following describes, with reference to the flowchart shown in FIG. 22, the preset recording setting processing of the VCR 12 which obtained the G-code supplied on the basis of the preset recording processing by the personal computer 5 described with reference to FIG. 11 or the preset recording processing by the mobile telephone 1 described with reference to FIG. 16.

In step S41, the controller 171 of the VCR 12 determines whether an infrared signal including the G-code has been received at the infrared signal receiver 172 from the personal computer 5 or the mobile telephone 1 (or the PDA 2) and waits until the G-code is received.

If the infrared signal including G-code is found received in step S41, the procedure goes to step S42.

In step S42, the controller 171 decodes the received G-code to analyze the preset recording information. For example, if the G-code generated from the preset recording data shown in FIG. 14 has been supplied by the infrared signal transmitted from the personal computer 5 in the process of step S8 of FIG. 11, the controller 171 determines that the broadcast channel of the program is "Nihon TV (channel 4)", the recording start date is "Jun. 2, 2000", the program start time is "19:00" and the program end time is "20:54".

In step S43, the controller 171 determines whether the settings (or parameters) of the preset recording data supplied by the G-code are normal or not, namely, for example, whether there is an overlap between the recording time of the preset recording data stored in the preset recording data storage section 181 and the recording time of the preset recording data received this time.

If the settings are found not normal in step S43, namely, there is an overlap between the recording times, the procedure goes to step S44.

In step S44, the controller 171 causes the signal processor 175 to generate a message telling that the settings are abnormal and displays the generated message on the television receiver via the video output section 179. It should be noted that this message may be displayed on the CRT display 140 of the personal computer 5 or the liquid crystal display 35 of the mobile telephone 1 as required.

FIG. 23 shows an example of the message to be displayed on the television receiver in the process of step S44. In this example, message "You cannot preset this program for recording because the data of preset recording number 1 partially overlap with recording time" is displayed. Namely, the preset recording data storage section 181 already stores the program of preset number 1. It should be noted that not only the message telling that the settings are improper but also information such as already preset program names, recording start times, and recording end times for example may be displayed. This allows the users of the personal computer 5 or the mobile telephone 1 (or the PDA 2) to know that the preset recording of particular programs is not allowed. Then, the setting of preset recording comes to an end.

On the other hand, if the settings of the preset recording data are found normal in step S43, the procedure goes to step S45, in which the controller 171 extracts the parameters from the received preset recording data.

In step S46, the controller 171 stores the parameters obtained in step S45 into the preset recording data storage section 181, starting a recording timer.

In step S47, the controller 171 generates a message including the information about the preset recording as shown in FIG. 24 and displays the generated message on the television receiver for confirmation by the user.

In the example shown in FIG. 24, message "Setting of preset recording has been completed. Preset number: 2" is displayed. Namely, the program to be preset for recording has been registered with the preset recording data storage section 181 as the program having preset number 2. It should be noted that not only the message telling the completion of the preset recording setting but also the information such as program name, recording start time, recording end time, and recording mode for example may be displayed. Then, the setting of the preset recording comes to an end.

Figure 25:
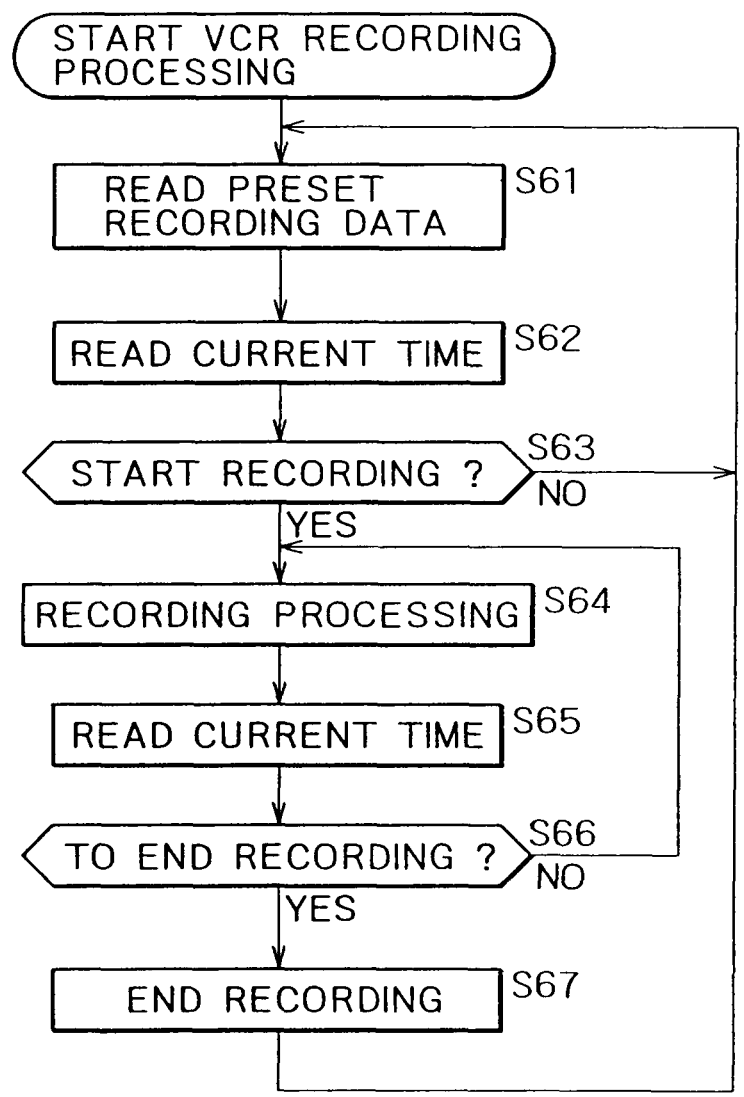
FIG. 25 is a flowchart for describing another processing operation of the VCR.

The following describes the recording to be executed by the VCR 12 with reference to the flowchart shown in FIG. 25.

In step S61, the controller 171 of the VCR 12 reads the preset recording data from the preset recording data storage section 181. In step S62, the controller 171 reads the current time from an RTC (Real Time Clock), not shown.

In step S63, the controller 171 compares the recording start time included in the preset recording data read in step S61 with the current time read in step S62, thereby determining whether to start the recording. Until the starting of the recording is determined, the controller 171 repeats the processes of steps S61 through S63.

In step S63, if the controller 171 determines that there is a program among the programs preset for recording in the preset recording data storage section 181 which is to be started for recording, then the procedure goes to step S64, in which the controller 171 starts recording that program. For example, if the preset recording data shown in step S62 are the data shown in the example of FIG. 14, the controller 171 instructs the tuner 174 to select "channel 4", then instructs the signal processor 175 to reproduce the program signal supplied from the tuner 174. Consequently, the program reproduced by the signal processor 175 is supplied to the cassette deck 176 to be recorded to a video cassette loaded in the cassette loader 177.

In step S65, the controller 171 reads the current time from the RTC, not shown. In step S66, the controller 171 compares the current time read in step S65 with the recording end time included in the preset recording data read from the preset recording data storage section 181 to determine whether to end the preset recording or not.

If the preset recording is determined not to be ended in step S66, the controller 171 repeats the above-mentioned preset recording processing back in step S64.

If the preset recording is determined to be ended in step S66, the controller 171 ends the preset recording in step S67.

Then, the procedure returns to step S61 to repeat the subsequent processing.

As described, the user of the mobile telephone 1, the PDA 2, or the personal computer 5 can set the preset recording of desired programs on the VCR 12 by use of the preset recording data of TVPI format stored in the EPG server 8.

It should be noted that the present invention is applicable not only the above-mentioned camera-mounted digital mobile telephone 1, the PDA 2, the personal computer 5 but also any devices that can be connected to the Internet 7 (namely, the EPG server 8).

If the VCR 12 is connected to the Internet 7 via the public switched line network 4 for example, the user may access the EPG server 8 from the VCR 12 and download the preset recording data as described above to set the preset recording. If the controller 171 of the VCR 12 cannot analyze the contents of the downloaded preset recording data, the user can use a conversion program for example stored in a memory, not shown, of the controller 171.

In the above-mentioned examples, the device on which television programs are recorded is the VCR 12. It will be apparent to those skilled in the art that the recording may also be made on any G-code compliant recorders such as hard disk recorder and DVCR for example.

The code to be converted may be information of any format as long as it describes broadcast date, broadcast channel, broadcast start time, and broadcast length of time like G-code which can be used by the VCR 12 for example for preset recording. Such information usable for preset recording as mentioned above may be transmitted to the VCR 12 not only by infrared signals but also by wireless signals based on the Bluetooth standard.

The above-mentioned sequences of processes may be executed by hardware but may also be executed by software. The execution by software is supported by a computer in which the programs constituting this software are stored in a dedicated hardware storage device or a general-purpose personal computer for example in which these programs are installed from a program storage medium.

The program storage medium storing the programs which are installed in a general-purpose personal computer for example to be made executable by the computer is a package medium constituted by the magnetic disk 121 (including floppy disk), the optical disk 122 (including CD-ROM (Compact Disk Read-Only Memory) and DVD (Digital Versatile Disk)), the magneto-optical disk 123 (including MD (Mini Disk)), or the semiconductor memory 124 as shown in FIG. 7 or the program storage medium is constituted by the flash ROM 93 or a hard disk for example which stores the programs on a temporary or permanent basis. As required, the programs are stored in the program storage medium by use of wired or wireless communications medium such as the public switched line network 4, a local area network, the Internet 7, or digital satellite broadcasting via such interface as router or modem.

The steps describing the programs provided by the above-mentioned program storage medium include not only processes which are executed in the described sequence in a time-dependent manner but also processes which are executed in parallel or discretely.

It should be noted that term "system" herein denotes an entire apparatus constituted by a plurality of devices.

As described and according to the invention, in accordance with the above-mentioned information processing apparatus and method and the computer programs stored in program storage media, the control information for controlling the preset recording of a television program is retrieved from the program information providing apparatus and the contents of the retrieved information are converted into code information which is used to set the presetting recording of the program to the recording apparatus. The obtained code information is transmitted to the recording apparatus. This novel constitution allows each user to easily and quickly set the preset recording of desired television programs on such recording devices as VCR.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus comprising:
   a connecting unit configured to directly access a remote program information providing server through the internet;
   an acquiring unit configured to acquire control information for controlling preset recording of a program by accessing said remote program information providing server through the connecting unit based on a user request to access the remote program information providing server;
   a converter configured to convert contents described in said acquired control information into code information for setting said program preset recording to a remote recording apparatus separate from the information processing apparatus;
   a transmitter configured to receive said code information from said converter and to transmit said received code information directly to said remote recording apparatus; and
   a display control unit configured to display a message when said code information is improper.

2. An information processing apparatus according to claim 1, wherein said control information acquired by said acquiring unit includes a program guide and said display control unit is further configured to display a program select screen according to said program guide.

3. An information processing apparatus according to claim 2, wherein said display program select screen is a category selection screen including plural categories.

4. An information processing apparatus according to claim 1, wherein said code information is G-code information.

5. An information processing apparatus according to claim 1, wherein said transmitter transmits said code information to said remote recording apparatus by use of an infrared signal.

6. An information processing apparatus according to claim 1, wherein said control information includes broadcast channel information, broadcast date, broadcast start time, and recording end time of said program.

7. An information processing method comprising:
   directly accessing, by a connecting unit, a remote program information providing server through the internet;
   acquiring, by an acquiring unit, control information for controlling preset recording of a program by accessing said remote program information providing server through the connecting unit based on a user request to access the remote program information providing server;

converting, by a converter, contents described in said acquired control information into code information for setting said program preset recording to a remote recording apparatus separate from the information processing apparatus;

receiving, at a transmitter, said code information and transmitting said received code information directly to said remote recording apparatus; and displaying, by a display control unit, a message when said code information is improper.

8. An information processing method according to claim 7, wherein said control information acquired by said acquiring unit includes a program guide and said displaying displays a program select screen according to said program guide.

9. An information processing method according to claim 8, wherein said display program select screen is a category selection screen having plural categories.

10. An information processing method according to claim 7, wherein said code information is G-code information.

11. An information processing method according to claim 7, wherein said transmitting transmits said code information to said remote recording apparatus by use of an infrared signal.

12. An information processing method according to claim 7, wherein said control information includes broadcast channel information, broadcast date, broadcast start time, and recording end time of said program.

13. A non-transitory computer readable medium including computer executable instructions comprising:

first computer executable instructions to control a connecting unit to directly access a remote program information providing server through the internet;

second computer executable instructions to control an acquiring unit to acquire control information for controlling preset recording of a program by accessing said remote program information providing server through the connecting unit based on a user request to access the remote program information providing server;

third computer executable instructions to control a converter to convert contents described in said acquired control information into code information for setting said program preset recording to a remote recording apparatus separate from the information processing apparatus;

fourth computer executable instructions to control a transmitter to receive said code information from said converter and to transmit said received code information directly to said remote recording apparatus; and fifth computer executable instructions to control a display control unit to display a message when said code information is improper.

14. A non-transitory computer readable medium according to claim 13, wherein said control information acquired by said acquiring unit includes a program guide and said display control unit controls display of a program select screen according to said program guide.

15. A non-transitory computer readable medium according to claim 14, wherein said display program select screen is a category selection screen having plural categories.

16. A non-transitory computer readable medium according to claim 13, wherein said code information is G-code information.

17. A non-transitory computer readable medium according to claim 13, wherein said fourth computer executable instructions further control said transmitter to transmit said code information to said remote recording apparatus by use of an infrared signal.

18. A non-transitory computer readable medium according to claim 13, wherein said control information includes broadcast channel information, broadcast date, broadcast start time, and recording end time of said program.

* * * * *